United States Patent
Wu et al.

(10) Patent No.: US 10,285,185 B2
(45) Date of Patent: May 7, 2019

(54) RESOURCE ALLOCATION METHOD AND COMMUNICATIONS TERMINAL

(71) Applicant: Huawei Technologies Co., Ltd., Shenzhen (CN)

(72) Inventors: Xiang Wu, Shanghai (CN); Lijun Song, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/487,863

(22) Filed: Apr. 14, 2017

(65) Prior Publication Data
US 2017/0303290 A1    Oct. 19, 2017

(30) Foreign Application Priority Data

Apr. 14, 2016    (CN) .......................... 2016 1 0232142

(51) Int. Cl.
*H04W 72/10* (2009.01)
*H04W 76/18* (2018.01)
*H04W 8/18* (2009.01)
*H04W 28/04* (2009.01)

(52) U.S. Cl.
CPC .......... *H04W 72/10* (2013.01); *H04W 8/183* (2013.01); *H04W 28/04* (2013.01); *H04W 76/18* (2018.02)

(58) Field of Classification Search
None
See application file for complete search history.

(56) References Cited

U.S. PATENT DOCUMENTS

| | | | |
|---|---|---|---|
| 2015/0245309 A1* | 8/2015 | Nayak | H04W 60/005 455/435.3 |
| 2016/0021660 A1* | 1/2016 | Krishnamurthy | H04W 72/0453 455/452.1 |
| 2016/0112084 A1* | 4/2016 | Parron | H04B 1/3816 455/558 |
| 2016/0142087 A1* | 5/2016 | Inampudi | H04W 48/16 455/558 |
| 2016/0227557 A1* | 8/2016 | Fanous | H04W 72/1215 |
| 2017/0048855 A1* | 2/2017 | Garg | H04L 43/16 |

FOREIGN PATENT DOCUMENTS

| | | |
|---|---|---|
| CN | 101098173 A | 1/2008 |
| CN | 104144406 A | 11/2014 |

* cited by examiner

*Primary Examiner* — Diane L Lo
(74) *Attorney, Agent, or Firm* — Leydig, Voit & Mayer, Ltd.

(57) ABSTRACT

A resource allocation method and a communications terminal are provided. The communications terminal includes a radio frequency (RF) system and a baseband processor, the baseband processor includes: a radio resource manager (RRM) and at least two modems, and the at least two modems include a first modem and a second modem; and the RRM is configured to: receive a service request that is of a first service and that is initiated by the first modem; receive a service request that is of a second service and that is initiated by the second modem, where the first service and the second service are configured to preempt a communication resource; and when determining that currently a conflict exists between the first service and the second service, compare a first dynamic priority of the first service with a second dynamic priority of the second service to allocate the communication resource.

20 Claims, 6 Drawing Sheets

RESOURCE ALLOCATION METHOD AND COMMUNICATIONS TERMINAL

CROSS-REFERENCE TO RELATED APPLICATIONS

This application claims priority to Chinese Patent Application No. 201610232142.X, filed on Apr. 14, 2016, which is hereby incorporated by reference in its entirety.

TECHNICAL FIELD

Embodiments of the present invention relate to the field of mobile communications technologies, and in particular, to a resource allocation method and a communications terminal.

BACKGROUND

With rapid development of communications technologies, people exchange information with each other more frequently, and one mobile phone can no longer meet people's requirements. Especially, people who work in sales or management sometimes need two or three or even more mobile phones to meet requirements. However, it is quite inconvenient to carry so many mobile phones. Therefore, a multiple-card multiple-standby mobile phone emerges in the market. With such a mobile phone, a user needs only one mobile phone in which multiple subscriber identity modules may be installed, which is obviously much more convenient than to carry multiple mobile phones.

In the prior art, in a multiple-card multiple-standby single-pass system, multiple mobile phone cards are continually switched between multiple networks of the multiple cards by using one set of communications module (including a radio frequency transceiver module, bottom-layer software, a control chip, and the like), to implement multiple-card multiple-standby in multiple communications modes (communications standards). Because switching occurs very fast, for example, each time of switching takes 1/1000 millisecond, a user cannot perceive that network switching occurs, and it is equivalent to that implementing simultaneous standby networking of multiple cards. In an actual application, if one card is performing a service, the card may be briefly referred to as a service card. The rest cards are in a standby state, and may be briefly referred to as non-service cards. When performing a service, a service card receives and sends communications signaling or data, and to maintain a standby function, a non-service card needs to keep receiving a broadcast message and a paging message. In addition, the non-service card further needs to perform cell measurement when the service card is performing a service. Therefore, a conflict exists between sending and receiving of multiple cards. However, fixed priorities are adopted in a resource allocation method in the prior art. When a conflict exists between resources that different cards apply for, a resource allocation module performs allocation according to a priority of a service. A service with a high priority obtains a resource first, and a service with a low priority obtains a resource later. When services for which application is separately made by two cards have a same priority, allocation is performed according to a sequence of the cards. For example, allocation is performed according to a sequence of a modem 1 and a modem 2. Each time the modem 1 and the modem 2 make application for services simultaneously, a service of the modem 1 may always be allocated, while a service of the modem 2 always cannot be allocated. Consequently, a service conflict cannot be resolved properly, and it is very likely to cause a call drop, a network disconnection or the like because the modem 2 obtains no resource for a long time, and user experience is severely affected.

SUMMARY

A technical problem to be resolved by embodiments of the present invention is how to provide a resource allocation method and a communications terminal, to resolve a problem in the prior art that a network disconnection of a service card or a non-service card in a multiple-card multiple-standby communications system may be caused by a sending and receiving conflict between the service card and the non-service card.

According to a first aspect, an embodiment of the present invention provides a communications terminal, where the terminal may include a radio frequency (RF) system and a baseband processor, where the baseband processor is connected to the RF system, the baseband processor may include: a radio resource manager (RRM) and at least two modems, and the at least two modems include a first modem and a second modem;

the first modem is configured to process a first service of a first subscriber identity module SIM card;

the second modem is configured to process a second service of a second SIM card; and the RRM is configured to:

receive a service request that is of the first service and that is initiated by the first modem;

receive a service request that is of the second service and that is initiated by the second modem, where the first service and the second service are configured to preempt a communication resource; and when determining that currently a conflict exists between the first service and the second service, compare a first dynamic priority of the first service with a second dynamic priority of the second service to allocate the communication resource to one of the first service and the second service, where the communication resource includes a resource formed by the RF system, each of the first service and the second service is a current service, and the RRM is further configured to calculate a dynamic priority of the current service according to an initial priority of the current service and a dynamic service adjustment parameter.

By means of the solution provided in this embodiment of the present invention, a priority of service resource allocation in a multiple-card multiple-standby single-pass system is not only related to a fixed initial priority, but also related to a service execution state or a service type, and dynamically changes according to an actual requirement, thereby effectively avoiding that when there is a service conflict, a service with a relatively low initial priority is disconnected from a network because no resource is allocated to the service for a long time, and improving user experience.

With reference to the first aspect, in a first possible implementation manner, the RF system includes a radio frequency integrated circuit RFIC, and the RFIC is configured to modulate or demodulate an RF signal related to a service processed by any one of the at least two modems.

With reference to the first possible implementation manner of the first aspect, in a second possible implementation manner, the RF system further includes an antenna and a radio frequency front end RFFE, the antenna is connected to the radio frequency front end RFFE, the RFFE is connected to the RFIC, and the RFFE receives or sends the RF signal by using the antenna.

With reference to the first aspect, or with reference to the first possible implementation manner of the first aspect, or with reference to the second possible implementation manner of the first aspect, in a third possible implementation manner, the dynamic service adjustment parameter includes a successive allocation failure count, the successive allocation failure count refers to a quantity of successive failures in applying for the communication resource to be allocated to the current service, and upon a success in applying for the communication resource to be allocated, the successive allocation failure count is reset to zero; and during calculation of the dynamic priority of the current service, the RRM is further configured to:

when determining that the current service meets any one condition in the following, calculate the dynamic priority of the current service according to the initial priority of the current service and the successive allocation failure count, where when the successive allocation failure count is 0, the calculated dynamic priority is equal to the initial priority; or when the successive allocation failure count is greater than 0, the calculated dynamic priority is higher than the initial priority, and the dynamic priority increases with the increase of the successive allocation failure count; and the any one condition includes:

the current service is a service with a fixed start moment, or a service without a fixed start moment and with infinite duration; or the current service is a service without a fixed start moment and with finite duration, and the dynamic priority of the current service remains within a third priority range within a first preset time period after a service request is initiated, where the initial priority of the current service is within a first priority range, and a priority corresponding to the third priority range is lower than a priority corresponding to the first priority range; or the dynamic priority of the current service is within a second priority range, and the RRM receives a service protection removal notification for the current service, where the service protection removal notification instructs to adjust the dynamic priority of the current service from the second priority range to a first priority range, and a priority corresponding to the second priority range is higher than a priority corresponding to the first priority range.

By means of the solution provided in this embodiment of the present invention, a priority of service resource allocation in a multiple-card multiple-standby single-pass system is not only related to a fixed initial priority, but also may be related to a successive allocation failure count of a service resource, where a larger successive allocation failure count indicates that a calculated dynamic priority is higher, so as to resolve a problem that a resource still cannot be allocated to a service after multiple failures of resource allocation.

With reference to the first aspect, or with reference to the first possible implementation manner of the first aspect, or with reference to the second possible implementation manner of the first aspect, in a fourth possible implementation manner, during calculation of the dynamic priority of the current service, the RRM is further configured to:

calculate the first dynamic priority according to a first calculation formula, where the first calculation formula is: F=C−(C−D)*(A/B), where F is a dynamic priority, C is an initial priority and is within a first priority range, D is a highest priority within the first priority range, A is a successive allocation failure count, B is a maximum threshold of the successive allocation failure count, a priority of C is lower than that of D, and A is less than B.

With reference to the first aspect, or with reference to the first possible implementation manner of the first aspect, or with reference to the second possible implementation manner of the first aspect, in a fifth possible implementation manner, the current service is a service with infinite duration, and the RRM is further configured to:

when any one condition in the following is met, adjust the dynamic priority of the current service to a highest priority within a first priority range, where the initial priority of the current service is within the first priority range; and the any one condition includes:

after the communication resource has been allocated to the current service, a single preemption time of the communication resource by another service except the current service within a preemption statistical period exceeds a first threshold, where the preemption statistical period is a second preset time period from a time at which the preemption of the communication resource by the another service except the current service starts to a time at which the preemption ends; or after the communication resource has been allocated to the current service, a total time during which the communication resource is preempted by another service except the current service exceeds a second threshold.

By means of the solution provided in this embodiment of the present invention, after a resource is allocated to a service with infinite duration in a multiple-card multiple-standby single-pass system by using a dynamic priority, after a time during which the service is preempted or interrupted by another service exceeds a particular period of time, the dynamic priority of the service can be directly increased to a higher level, to avoid a problem that the service fails to be executed because the service stays preempted or interrupted by the another service.

With reference to the first aspect, or with reference to the first possible implementation manner of the first aspect, or with reference to the second possible implementation manner of the first aspect, in a sixth possible implementation manner, the initial priority of the current service is within a first priority range; the dynamic service adjustment parameter includes a first protection priority; and during the calculation of the dynamic priority of the current service, the RRM is further configured to:

when a service protection notification for the current service is received, calculate the dynamic priority of the current service according to the obtained initial priority and the first protection priority, where the service protection notification is used to instruct to ensure that the communication resource is allocated to the current service, the first protection priority is a highest priority within the first priority range, the calculated dynamic priority of the current service is within a second priority range, and a priority corresponding to the second priority range is higher than a priority corresponding to the first priority range.

By means of the solution provided in this embodiment of the present invention, a dynamic priority of a service on which radio frequency protection needs to be performed and that is in a multiple-card multiple-standby single-pass system can be directly increased to a higher level, to ensure successful execution of the service.

With reference to the first aspect, or with reference to the first possible implementation manner of the first aspect, or with reference to the second possible implementation manner of the first aspect, in a seventh possible implementation manner, during the calculation of the dynamic priority of the current service, the RRM is further configured to:

when a service protection notification for the current service is received, calculate the dynamic priority of the current service according to a second calculation formula, where the service protection notification is used to instruct to ensure that the communication resource is allocated to the current service, and the second calculation formula is: F=E+(C/N), where F is a dynamic priority, C is an initial priority and is within a first priority range, E is a highest priority within the first priority range, and N is a natural number greater than 1.

With reference to the first aspect, or with reference to the first possible implementation manner of the first aspect, or with reference to the second possible implementation manner of the first aspect, in an eighth possible implementation manner, the current service is a service without a fixed start moment and with finite duration; the dynamic service adjustment parameter includes a protection removal priority; and during the calculation of the dynamic priority of the current service, the RRM is further configured to:

calculate the dynamic priority of the current service according to the obtained initial priority and the protection removal priority, where the initial priority of the current service is within a first priority range, the protection removal priority is a lowest priority within the first priority range, the calculated dynamic priority of the current service is within a third priority range, and a priority corresponding to the third priority range is lower than a priority corresponding to the first priority range.

By means of the solution provided in this embodiment of the present invention, when radio frequency protection no longer needs to be performed on a service on which radio frequency protection has been performed and that is in a multiple-card multiple-standby single-pass system, a dynamic priority of the service can be reduced to a normal level.

With reference to the third possible implementation manner of the first aspect, or with reference to the sixth possible implementation manner of the first aspect, or with reference to the eighth possible implementation manner of the first aspect, in a ninth possible implementation manner, the calculated dynamic priority increases with the increase of the initial priority of the current service.

With reference to the first aspect, or with reference to the first possible implementation manner of the first aspect, or with reference to the second possible implementation manner of the first aspect, in a tenth possible implementation manner, the current service is a service without a fixed start moment and with finite duration; and during the calculation of the dynamic priority of the current service, the RRM is further configured to:

calculate the dynamic priority of the current service according to a third calculation formula, where the third calculation formula is: F=E+(C/N), where F is a dynamic priority, C is an initial priority and is within a first priority range, E is a lowest priority within the first priority range, and N is a natural number greater than 1.

With reference to the first aspect, or with reference to the first possible implementation manner of the first aspect, or with reference to the second possible implementation manner of the first aspect, in an eleventh possible implementation manner, the current service is a periodic service, the periodic service includes services at multiple time points, and an interval between services at adjacent time points is a period of the periodic service; and the RRM is further configured to:

calculate a dynamic priority of a service at an $M^{th}$ time point according to the initial priority of the current service and a successive allocation failure count of a service between a first time point and an $(M-2)^{th}$ time point, where an interval between the $(M-2)^{th}$ time point and the $M^{th}$ time point is two periods of the periodic service, and M is a natural number greater than 3, where when the successive allocation failure count of the service between the first time point and the $(M-2)^{th}$ time point is 0, the calculated dynamic priority of the service at the $M^{th}$ time point is equal to an initial priority of the periodic service; or when the successive allocation failure count of the service between the first time point and the $(M-2)^{th}$ time point is greater than 0, the calculated dynamic priority of the service at the $M^{th}$ time point is higher than the initial priority, and the dynamic priority increases with the increase of the successive allocation failure count.

By means of the solution provided in this embodiment of the present invention, for a periodic service in a multiple-card multiple-standby single-pass system, when a resource fails to be allocated to a periodic service at one time point, a dynamic priority can be increased appropriately for a periodic service at a time point after a next time point of the time point, so that a resource can be successfully allocated to the periodic service.

According to a second aspect, an embodiment of the present invention provides a resource allocation apparatus, applied to a terminal including a RF system and a baseband processor, where the baseband processor includes a RRM and at least two modems, the at least two modems include a first modem and a second modem, and the apparatus may include:

a receiving module, configured to receive a service request that is of a first service and that is initiated by the first modem, where the first modem is configured to process a first service of a first subscriber identity module SIM card;

an allocation module, configured to: when determining that there currently exists a second service that is initiated by the second modem and that is in a conflict with the first service in preempting a communication resource, compare a first dynamic priority of the first service with a second dynamic priority of the second service to allocate the communication resource to one of the first service and the second service, where the second modem is configured to process the second service of a second SIM card, the communication resource includes a resource formed by the RF system, each of the first service and the second service is a current service, and a dynamic priority of the current service is calculated by the RRM according to an initial priority of the current service and a dynamic service adjustment parameter.

With reference to the second aspect, in a first possible implementation manner, the dynamic service adjustment parameter includes a successive allocation failure count, the successive allocation failure count refers to a quantity of successive failures in applying for the communication resource to be allocated to the current service, and upon a success in applying for the communication resource to be allocated, the successive allocation failure count is reset to zero; and the apparatus further includes:

a first priority calculation module, configured to: when determining that the current service meets any one condition in the following, calculate the dynamic priority of the current service according to the initial priority of the current service and the successive allocation failure count, where when the successive allocation failure count is 0, the calculated dynamic priority is equal to the initial priority; or when the successive allocation failure count is greater than 0, the calculated dynamic priority is higher than the initial priority, and the dynamic priority increases with the increase of the successive allocation failure count; and the any one condition includes:

the current service is a service with a fixed start moment, or a service without a fixed start moment and with infinite duration; or the current service is a service without a fixed start moment and with finite duration, and the dynamic priority of the current service remains within a third priority range within a first preset time period after a service request is initiated, where the initial priority of the current service is within a first priority range, and a priority corresponding to the third priority range is lower than a priority corresponding to the first priority range; or the dynamic priority of the current service is within a second priority range, and the RRM receives a service protection removal notification for the current service, where the service protection removal notification instructs to adjust the dynamic priority of the current service from the second priority range to a first priority range, and a priority corresponding to the second priority range is higher than a priority corresponding to the first priority range.

With reference to the second aspect, in a second possible implementation manner, the apparatus further includes:

a first calculation module, configured to calculate the first dynamic priority according to a first calculation formula, where the first calculation formula is: $F=C-(C-D)*(A/B)$, where F is a dynamic priority, C is an initial priority and is within a first priority range, D is a highest priority within the first priority range, A is a successive allocation failure count, B is a maximum threshold of the successive allocation failure count, a priority of C is lower than that of D, and A is less than B.

With reference to the second aspect, in a third possible implementation manner, the current service is a service with infinite duration, and the apparatus further includes:

a second priority calculation module, configured to: when any one condition in the following is met, adjust the dynamic priority of the current service to a highest priority within a first priority range, where the initial priority of the current service is within the first priority range; and the any one condition includes:

after the communication resource has been allocated to the current service, a time for which the communication resource is preempted by another service except the current service for a single time within a preemption statistical period exceeds a first threshold, where the preemption statistical period is a second preset time period from a time at which the preemption of the communication resource by the another service except the current service starts to a time at which the preemption ends; or after the communication resource has been allocated to the current service, a total time during which the communication resource is preempted by another service except the current service exceeds a second threshold.

With reference to the second aspect, in a fourth possible implementation manner, the initial priority of the current service is within a first priority range, and the dynamic service adjustment parameter includes a first protection priority; and the apparatus further includes:

a third priority calculation module, configured to: when a service protection notification for the current service is received, calculate the dynamic priority of the current service according to the obtained initial priority and the first protection priority, where the service protection notification is used to instruct to ensure that the communication resource is allocated to the current service, the first protection priority is a highest priority within the first priority range, the calculated dynamic priority of the current service is within a second priority range, and a priority corresponding to the second priority range is higher than a priority corresponding to the first priority range.

With reference to the second aspect, in a second possible implementation manner, the apparatus further includes:

a second calculation module, configured to: when a service protection notification for the current service is received, calculate the dynamic priority of the current service according to a second calculation formula, where the service protection notification is used to instruct to ensure that the communication resource is allocated to the current service, and the second calculation formula is: $F=E+(C/N)$, where F is a dynamic priority, C is an initial priority and is within a first priority range, E is a highest priority within the first priority range, and N is a natural number greater than 1.

With reference to the second aspect, in a sixth possible implementation manner, the current service is a service without a fixed start moment and with finite duration; the dynamic service adjustment parameter includes a protection removal priority; and the apparatus further includes:

a fourth priority calculation module, configured to calculate the dynamic priority of the current service according to the obtained initial priority and the protection removal priority, where the initial priority of the current service is within a first priority range, the protection removal priority is a lowest priority within the first priority range, the calculated dynamic priority of the current service is within a third priority range, and a priority corresponding to the third priority range is lower than a priority corresponding to the first priority range.

With reference to the first possible implementation manner of the second aspect, or with reference to the fourth possible implementation manner of the second aspect, or with reference to the sixth possible implementation manner of the second aspect, in a seventh possible implementation manner, the calculated dynamic priority increases with the increase of the initial priority of the current service.

With reference to the second aspect, in an eighth possible implementation manner, the current service is a service without a fixed start moment and with finite duration, and the apparatus further includes:

a third calculation module, configured to calculate the dynamic priority of the current service according to a third calculation formula, where the third calculation formula is: $F=E+(C/N)$, where F is a dynamic priority, C is an initial priority and is within a first priority range, E is a lowest priority within the first priority range, and N is a natural number greater than 1.

With reference to the second aspect, in a ninth possible implementation manner, the current service is a periodic service, the periodic service includes services at multiple time points, and an interval between services at adjacent time points is a period of the periodic service; and the apparatus further includes:

a fifth priority calculation module, configured to calculate a dynamic priority of a service at an $M^{th}$ time point according to the initial priority of the current service and a successive allocation failure count of a service between a first time point and an $(M-2)^{th}$ time point, where an interval between the $(M-2)^{th}$ time point and the Mt time point is two periods of the periodic service, and M is a natural number greater than 3, where when the successive allocation failure count of the service between the first time point and the $(M-2)^{th}$ time point is 0, the calculated dynamic priority of the service at the $M^{th}$ time point is equal to an initial priority of the periodic service; or when the successive allocation failure count of the service between the first time point and the $(M-2)^{th}$ time point is greater than 0, the calculated dynamic priority of the service at the Ma1 time point is higher than the initial priority, and the dynamic priority increases with the increase of the successive allocation failure count.

According to a third aspect, an embodiment of the present invention provides a resource allocation method, applied to a terminal including a RF system and a baseband processor, where the baseband processor includes a RRM and at least two modems, the at least two modems include a first modem and a second modem, and the method may include:

receiving, by the RRM, a service request that is of a first service and that is initiated by the first modem, where the first modem is configured to process a first service of a first subscriber identity module SIM card;

when the RRM determines that there currently exists a second service that is initiated by the second modem and that is in a conflict with the first service in preempting a communication resource, comparing a first dynamic priority of the first service with a second dynamic priority of the second service to allocate the communication resource to one of the first service and the second service, where the second modem is configured to process the second service of a second SIM card, the communication resource includes a resource formed by the RF system, each of the first service and the second service is a current service, and a dynamic priority of the current service is calculated by the RRM according to an initial priority of the current service and a dynamic service adjustment parameter.

With reference to the third aspect, in a first possible implementation manner, the dynamic service adjustment parameter includes a successive allocation failure count, the successive allocation failure count refers to a quantity of successive failures in applying for the communication resource to be allocated to the current service, and upon a success in applying for the communication resource to be allocated, the successive allocation failure count is reset to zero; and the method further includes:

when the RRM determines that the current service meets any one condition in the following, calculating, by the RRM, the dynamic priority of the current service according to the initial priority of the current service and the successive allocation failure count, where when the successive allocation failure count is 0, the calculated dynamic priority is equal to the initial priority; or when the successive allocation failure count is greater than 0, the calculated dynamic priority is higher than the initial priority, and the dynamic priority increases with the increase of the successive allocation failure count; and the any one condition includes:

the current service is a service with a fixed start moment, or a service without a fixed start moment and with infinite duration; or the current service is a service without a fixed start moment and with finite duration, and the dynamic priority of the current service remains within a third priority range within a first preset time period after a service request is initiated, where the initial priority of the current service is within a first priority range, and a priority corresponding to the third priority range is lower than a priority corresponding to the first priority range; or the dynamic priority of the current service is within a second priority range, and the RRM receives a service protection removal notification for the current service, where the service protection removal notification instructs to adjust the dynamic priority of the current service from the second priority range to a first priority range, and a priority corresponding to the second priority range is higher than a priority corresponding to the first priority range.

With reference to the third aspect, in a second possible implementation manner, the method further includes:

calculating, by the RRM, the first dynamic priority according to a first calculation formula, where the first calculation formula is: $F=C-(C-D)*(A/B)$, where F is a dynamic priority, C is an initial priority and is within a first priority range, D is a highest priority within the first priority range, A is a successive allocation failure count, B is a maximum threshold of the successive allocation failure count, a priority of C is lower than that of D, and A is less than B.

With reference to the third aspect, in a third possible implementation manner, the current service is a service with infinite duration, and the method further includes:

when any one condition in the following is met, adjusting, by the RRM, the dynamic priority of the current service to a highest priority within a first priority range, where the initial priority of the current service is within the first priority range; and the any one condition includes:

after the communication resource has been allocated to the current service, a time for which the communication resource is preempted by another service except the current service for a single time within a preemption statistical period exceeds a first threshold, where the preemption statistical period is a second preset time period from a time at which the preemption of the communication resource by the another service except the current service starts to a time at which the preemption ends; or after the communication resource has been allocated to the current service, a total time during which the communication resource is preempted by another service except the current service exceeds a second threshold.

With reference to the third aspect, in a fourth possible implementation manner, the initial priority of the current service is within a first priority range; the dynamic service adjustment parameter includes a first protection priority; and the method further includes:

when the RRM receives a service protection notification for the current service, calculating, by the RRM, the dynamic priority of the current service according to the obtained initial priority and the first protection priority, where the service protection notification is used to instruct to ensure that the communication resource is allocated to the current service, the first protection priority is a highest priority within the first priority range, the calculated dynamic priority of the current service is within a second priority range, and a priority corresponding to the second priority range is higher than a priority corresponding to the first priority range.

With reference to the third aspect, in a fifth possible implementation manner, the method further includes:

when the RRM receives a service protection notification for the current service, calculating, by the RRM, the dynamic priority of the current service according to a second calculation formula, where the service protection notification is used to instruct to ensure that the communication resource is allocated to the current service, and the second calculation formula is: $F=E+(C/N)$, where F is a dynamic priority, C is an initial priority and is within a first priority range, E is a highest priority within the first priority range, and N is a natural number greater than 1.

With reference to the third aspect, in a sixth possible implementation manner, the current service is a service without a fixed start moment and with finite duration; the dynamic service adjustment parameter includes a protection removal priority; and the method further includes:

calculating, by the RRM, the dynamic priority of the current service according to the obtained initial priority and the protection removal priority, where the initial priority of the current service is within a first priority range, the protection removal priority is a lowest priority within the first priority range, the calculated dynamic priority of the current service is within a third priority range, and a priority corresponding to the third priority range is lower than a priority corresponding to the first priority range.

With reference to the first possible implementation manner of the third aspect, or with reference to the fourth possible implementation manner of the third aspect, or with reference to the sixth possible implementation manner of the third aspect, in a seventh possible implementation manner, the calculated dynamic priority increases with the increase of the initial priority of the current service.

With reference to the third aspect, in an eighth possible implementation manner, the current service is a service without a fixed start moment and with finite duration, and the method further includes:

calculating, by the RRM, the dynamic priority of the current service according to a third calculation formula, where the third calculation formula is: $F=E+(C/N)$, where F is a dynamic priority, C is an initial priority and is within a first priority range, E is a lowest priority within the first priority range, and N is a natural number greater than 1.

With reference to the third aspect, in a ninth possible implementation manner, the current service is a periodic service, the periodic service includes services at multiple time points, and an interval between services at adjacent time points is a period of the periodic service; and the method further includes:

calculating, by the RRM, a dynamic priority of a service at an $M^{th}$ time point according to the initial priority of the current service and a successive allocation failure count of a service between a first time point and an $(M-2)^{th}$ time point, where an interval between the $(M-2)^{th}$ time point and the $M^{th}$ time point is two periods of the periodic service, and M is a natural number greater than 3, where when the successive allocation failure count of the service between the first time point and the $(M-2)^{th}$ time point is 0, the calculated dynamic priority of the service at the $M^{th}$ time point is equal to an initial priority of the periodic service; or when the successive allocation failure count of the service between the first time point and the $(M-2)^{th}$ time point is greater than 0, the calculated dynamic priority of the service at the $M^{th}$ time point is higher than the initial priority, and the dynamic priority increases with the increase of the successive allocation failure count.

Implementation of the embodiments of the present invention has the following beneficial effect:

In the embodiments of the present invention, a communications terminal is provided and includes a RF system and a baseband processor, where the baseband processor is connected to the RF system, the baseband processor includes: a RRM and at least two modems; the RRM is configured to: when determining that currently a conflict exists between a first service and a second service, compare a first dynamic priority of the first service with a second dynamic priority of the second service to allocate a communication resource to one of the first service and the second service; the at least two modems include a first modem and a second modem, where the first modem is configured to process the first service of a first subscriber identity module SIM card, the second modem is configured to process a second service of a second SIM card, the first service and the second service are configured to preempt a communication resource, each of the first service and the second service is a current service, and the RRM is further configured to calculate a dynamic priority of the current service according to an initial priority of the current service and a dynamic service adjustment parameter. The communications terminal provided in the present invention resolves a problem in the prior art that improper resource allocation is easily caused because a multiple-card multiple-standby single-pass system allocates a communication resource according to only a principle of performing allocation by using an initial fixed priority of a service, and avoids a problem such as a call drop or a network disconnection because no resource is allocated to the service for a long time, thereby improving user experience.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
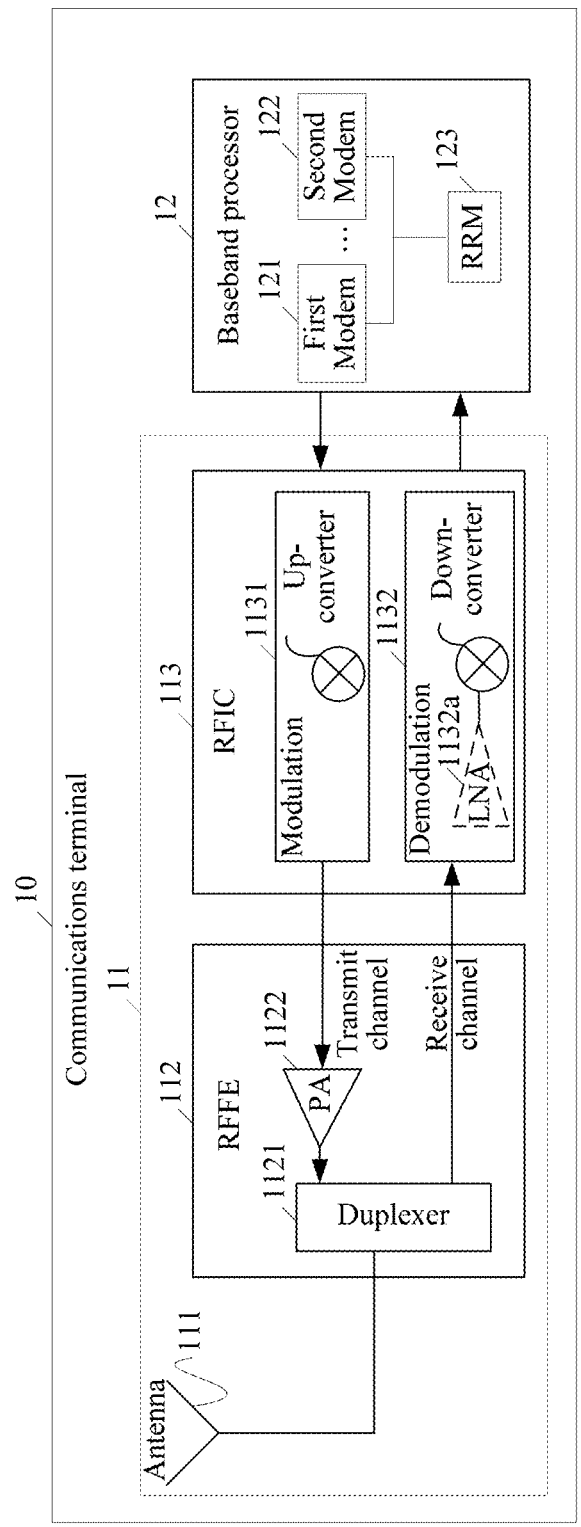
FIG. 1 is a schematic structural diagram of a communications terminal according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

It should be noted that the terms used in the embodiments of the present invention are merely for the purpose of illustrating specific embodiments, and are not intended to limit the present invention. It should be understood that, terms such as first and second are used to describe message services or modules in this specification, but these message services or modules should not be limited by these terms, and these terms are only used to distinguish these message services or modules. It should be further understood that, unless the context clearly supports an exception, a singular form "one" ("a", "an", and "the") used in this specification is intended to include a plural form. It should be further understood that, "and/or" used in this specification refers to that any one combination or all possible combinations of one or more listed related items.

A communications terminal in the embodiments of the present invention includes, but is not limited to, user equipment such as a smart mobile phone on which multiple subscriber identity module SIM cards can be operated, a tablet computer, a media player, an intelligent television, a smart band, a smart wearable device, an MP3 (Moving Picture Experts Group Audio Layer III, Moving Picture Experts Group Audio Layer III) player, an MP4 (Moving Picture Experts Group Audio Layer IV, Moving Picture Experts Group Audio Layer IV) player, a personal digital assistant (Personal Digital Assistant, PDA), or a laptop computer. User equipment configured for communication can work in various types of wireless communications standards, and each wireless communications standard may be applied to a communications system, for example: a global system for mobile communications (Global System of Mobile communication, "GSM" for short) system, a code division multiple access (Code Division Multiple Access, "CDMA" for short) system, a wideband code division multiple access (Wideband Code Division Multiple Access, "WCDMA" for short) system, a general packet radio service (General Packet Radio Service, "GPRS" for short), a long term evolution (Long Term Evolution, "LTE" for short) system, an LTE frequency division duplex (Frequency Division Duplex, "FDD" for short) system, LTE time division duplex (Time Division Duplex, "TDD" for short), a universal mobile telecommunications system (Universal Mobile Telecommunication System, "UMTS" for short), or a worldwide interoperability for microwave access (Worldwide Interoperability for Microwave Access, "WiMAX" for short) communications system, and may also be applied to a system that may appear in the future.

To better understand the embodiments of the present invention, the following first describes a structure of a communications terminal in the embodiments of the present invention. Referring to FIG. 1, FIG. 1 is a schematic structural diagram of a communications terminal 10 according to an embodiment of the present invention. As shown in FIG. 1, the communications terminal may include a radio frequency (Radio Frequency, RF) system 11 and a baseband processor 12, where the baseband processor 12 is connected to the RF system 11, the RF system 11 may include at least one of an antenna 111, a radio frequency front end (Radio Frequency Front End, RFFE) 112 or a radio frequency integrated circuit (Radio Frequency Integrated Circuits, RFIC) 113. In a possible implementation manner, the RF system 11 includes a radio frequency integrated circuit RFIC 113, and the RFIC 113 is configured to modulate or demodulate an RF signal related to a service processed by any one of at least two modems (a first modem 121 and a second modem 122). Further, the RF system 11 further includes an antenna 111 and a radio frequency front end RFFE 112, where the antenna 111 is connected to the radio frequency front end RFFE 112, the RFFE 112 is connected to the RFIC 113, and the RFFE 112 receives or sends the RF signal by using the antenna. It is assumed that the RF system 11 includes an antenna 111, an RFFE 112, and an RFIC 113, where the RFFE 112 modulates, by using the RFIC 113, a signal sent by the baseband processor 12 and transmits the modulated signal on the antenna (transmit channel), or the RFFE 112 demodulates a received air interface signal by using the RFIC 113 and sends the demodulated signal to the baseband processor 12 at a back end for communication protocol processing (receive channel). The RFFE 112 specifically includes: a duplexer 1121 and a power amplifier (Power Amplifier, PA) 1122. The duplexer 1121 is configured to couple both the transmit channel and the receive channel (as shown by the arrow directions) to the antenna, so that the antenna may perform sending or receiving or both sending and receiving; and the PA 1122 is configured to perform a power amplification function on a transmit signal on the transmit channel, so that an amplified signal may be sent from the antenna. The RFIC 113 is a modulation and demodulation unit at a back end of the RFFE 112, where modulation is to convert a low-frequency signal of a baseband on the transmit channel into a high-frequency RF signal (that is, up-conversion, a function of which is implemented by an up-converter 1131 in FIG. 1), and demodulation is to demodulate a high-frequency RF signal on the receive channel into a baseband signal (that is, down-conversion, a function of which is implemented by a down-converter 1132 in FIG. 1). An up-/down-converter is a mixer, which mixes a high-frequency RF signal and a local-frequency signal to generate a baseband signal, or mixes a baseband signal and a local-frequency signal to generate a high-frequency RF signal. Before demodulation is performed on the receive channel, an LNA 1132a, that is, a low noise amplifier, may be further included, and is used to perform amplification on a receive signal.

The baseband processor 12 mainly processes a baseband signal, and may process various types of communications protocols such as 2/3/4/5G (generation, Generation). The baseband processor 12 mainly includes a radio resource manager (Radio Resource Management, RRM) 123 and at least two modems, that is, a first modem 121 and a second modem 122. An effect of each modem is mainly processing a part of functions of communicating with a base station, including a part of functions related to a terminal making a call, sending an SNS message, and accessing the Internet (for example, a data function of a communications standard such as GPRS, WCDMA, or LTE), such as at least one of channel encoding/decoding, precoding/decoding, MIMO (multiple-input multiple-output) processing, or signal interleaving/de-interleaving processing. The RRM is included inside the baseband processor, and is used to schedule an RF resource applied for by each modem, and the RRM calculates a dynamic priority according to a parameter such as a service status and an initial priority, and allocates communication resources (including an RF resource and a CPU (central processing unit) resource) according to priorities. A specific manner for calculating a dynamic priority is given in subsequent embodiments. The service involved in this embodiment or the subsequent embodiments is a wireless communication service, and generally may include at least one of a PS (packet switched) service or a CS service. For example, the service may be an operator voice service, a VoIP (voice over Internet protocol) service, a data downloading (from the base station to the communications terminal 10) and uploading (from the communications terminal 10 to the base station) service, or a short messaging service message service, and may selectively include a service such as receiving system paging or system broadcast.

It may be understood that, the baseband processor 12 may further include a clock module, which is mainly configured to generate, for the baseband processor 12, a clock needed for data transmission and timing control; and may further include a power management module, which is mainly configured to provide a stable and high-precision voltage to the baseband processor 12, the radio frequency system 11, and a peripheral system. It may be further understood that, the communications terminal 10 may further include a peripheral system, which is mainly configured to implement an interaction function between the communications terminal 10 and a user/an external environment. During specific implementation, the peripheral system may include: a display (LCD) controller, a camera controller, an audio controller, a touchscreen controller, and a sensor management module. Each controller may couple with a corresponding respective peripheral device. In some embodiments, the peripheral system may further include another I/O peripheral controller or the like, which is not specifically limited in the present invention.

The foregoing structure of the communications terminal in FIG. 1 is only a preferred implementation manner of this embodiment of the present invention, and the structure of the communications terminal in this embodiment of the present invention includes, but is not limited to, the foregoing structure, provided that a structure of a communications terminal of a multiple-card multiple-standby resource allocation method in the present invention can fall within a scope protected and covered by the present invention.

Figure 2:
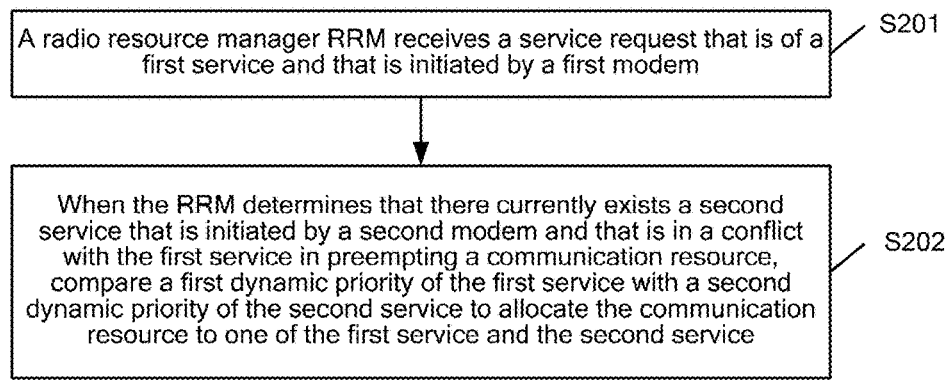
FIG. 2 is a schematic flowchart of a resource allocation method according to an embodiment of the present invention.

Referring to FIG. 2, FIG. 2 is a schematic flowchart of a resource allocation method according to an embodiment of the present invention. The foregoing communications terminal in FIG. 1 is configured to support and perform step S201 and step S202 of a method procedure shown in FIG. 2. With reference to the communications terminal corresponding to FIG. 1 and the method procedure corresponding to FIG. 2, the following describes and illustrates in detail a specific action procedure performed by and a corresponding function completed by the communications terminal 10 in the present invention on a side of an RRM in a baseband processor of the communications terminal.

S201: A RRM receives a service request that is of a first service and that is initiated by a first modem.

Specifically, a hardware system of the communications terminal 10 on which this embodiment of the present invention is based is a multiple-card multiple-standby single-pass system; therefore, the system may include multiple modems (for example, multiple SIM (subscriber identity module) cards may be inserted in a mobile phone). When only one modem (corresponding to one SIM card) needs to perform a communication service, the RRM receives a service request sent by one modem corresponding to one SIM card; and when multiple modems (each modem corresponds to one SIM card) need to perform a communication service, the RRM receives a service request separately sent by multiple modems corresponding to multiple SIM cards.

In this embodiment of the present invention, the first modem 121 is configured to process a first service of a first subscriber identity module SIM card, and the second modem 122 is configured to process a second service of a second SIM card. The RRM 123 may be configured to receive a service request that is of the first service and that is initiated by the first modem 121, or may be configured to receive a service request that is of the second service and that is initiated by the second modem 122, where the first service and the second service are configured to preempt a communication resource. Because in this embodiment of the present invention, there exists a service conflict between the first service and the second service, the following two cases are mainly included: The RRM 123 simultaneously receives the service request of the first service and the service request of the second service; or when the RRM 123 receives the service request of the first service, the second service is being executed (is occupying the communication resource). It should be noted that, in the prior art, a service conflict exists between services in application made by different modems only, and there exists no service conflict between services in application made by a same modem. It may be understood that, in each embodiment of the present invention, different modems corresponding to different SIM cards may be based on different communications standards or a same communications standard. Generally, the multiple modems correspond to different communications standards. For example, the first modem is applicable to a GSM standard, and the second modem is applicable to an LTE, WCDMA, TDSCDMA (Time Division Synchronous Code Division Multiple Access) or GSM standard.

S202: When the RRM determines that there currently exists a second service that is initiated by the second modem and that is in a conflict with the first service in preempting a communication resource, compare a first dynamic priority of the first service with a second dynamic priority of the second service to allocate the communication resource to one of the first service and the second service.

Specifically, because in the prior art, a corresponding priority is set for different modems or different services, and the priority is fixed, that is, no matter when or where or in which case application for a communication resource is made for a service, the initial priority is fixed. In this embodiment of the present invention, for the technical problem, while an initial priority of a service is maintained, a dynamic service adjustment parameter (which may include parameters such as an execution state of the service, a type of the service, a current actual requirement of the service, a level at which the service currently needs to be protected or does not need to be protected) is further added. When determining that there currently exists a second service that is initiated by the second modem 122 and that is in a conflict with the first service in preempting a communication resource, the RRM 123 compares a first dynamic priority of the first service with a second dynamic priority of the second service to allocate the communication resource to one of the first service and the second service. That is, the communication resource is allocated sequentially according to dynamic priorities of the second service and the first service, where the communication resource may include at least one of an RF system resource, a CPU resource, or a system resource. When each of the first service and the second service is regarded as a current service, the RRM 123 may be further configured to calculate a dynamic priority of the current service according to an initial priority of the current service (the first service and/or the second service) and the dynamic service adjustment parameter. A specific calculation process is illustrated in detail in the subsequent embodiments. It should be stressed that in the present invention, calculation of the dynamic priority of the current service may be performed immediately after a service request of the current service is received, or may be performed only when it is determined that a service conflict currently exists between another service and the current service, which is not specifically limited in the present invention, provided that the dynamic priority of the current service (such as the first service and the second service) may be obtained before resource allocation needs to be performed according to the dynamic priority when there exists a service conflict. Details are not described again in the subsequent embodiments of the present invention.

Next, how a RRM in the present invention calculates the dynamic priority of the current service is illustrated in detail and described by using an example:

In a possible implementation manner, the dynamic service adjustment parameter includes a successive allocation failure count, the successive allocation failure count refers to a quantity of successive failures in applying for the communication resource to be allocated to the current service, and upon a success in applying for the communication resource to be allocated, the successive allocation failure count is reset to zero. A process of calculating the dynamic priority of the current service by the RRM may be specifically: when the RRM determines that the current service meets any one condition in the following, calculating the dynamic priority of the current service according to the initial priority of the current service and the successive allocation failure count, where when the successive allocation failure count is 0, the calculated dynamic priority is equal to the initial priority; and when the successive allocation failure count is greater than 0, the calculated dynamic priority is higher than the initial priority, and the dynamic priority increases with the increase of the successive allocation failure count. That is, in this case, the dynamic priority of the service is mainly related to the successive allocation failure count of a service resource, and when a resource fails to be allocated to the service multiple successive times, the priority of the service can be improved appropriately, to prevent the service from staying in a state of a vicious circle in which no resource is allocated to the service because of a low initial priority.

The any one condition includes:

condition 1: the current service is a service with a fixed start moment (such as a demodulation paging service), or a service without a fixed start moment and with infinite duration (such as a phone or a data service); or condition 2: the current service is a service without a fixed start moment and with finite duration (such as a group broadcast service or a measurement report service that does not strictly require a service execution time), and the dynamic priority of the current service remains within a third priority range (low priority range) within a first preset time period after a service request is initiated, where the initial priority of the current service is within a first priority range (medium priority range), and a priority corresponding to the third priority range is lower than a priority corresponding to the first priority range; or condition 3: the dynamic priority of the current service is within a second priority range (on which radio frequency protection is performed and the dynamic priority is within a protected high priority range), and the RRM receives a service protection removal notification for the current service, where the service protection removal notification instructs to adjust the dynamic priority of the current service from the second priority range to a first priority range, and a priority corresponding to the second priority range is higher than a priority corresponding to the first priority range. That is, in this embodiment, the RRM previously receives the service protection notification for the current service and performs corresponding dynamic priority protection (a priority is increased to the second priority range, that is, the high priority range). When priority protection no longer needs to be performed on the current service, after service protection is performed, service protection removal may be performed, and further, a dynamic priority range of the current service is reduced from a high second priority range to a first priority protection range by using a related calculation method (such as a first calculation formula mentioned subsequently) of a dynamic priority. It should be noted that, first calculation formulas mentioned in the embodiments of the present invention may be regarded as a same calculation formula.

Further, when quantities of successive allocation failures of different services are the same, a calculated dynamic priority is larger for a service with a higher initial priority, that is, when quantities of successive allocation failures of resources of different services are the same, comparison and determining may be further performed according to initial priorities of the different services, and a resource may be preferentially allocated to a service with a high initial priority. It should be noted that, parameters, such as the initial priority of the current service and the successive allocation failures, obtained by the RRM may be related parameters carried in the service request that is of the current service and that is initiated by a related modem, or may be obtained by the RRM from a storage unit of the RRM according to index information of related parameters, which is not specifically limited in the present invention.

Further, the RRM calculates the first dynamic priority according to a first calculation formula, where the first calculation formula is specifically: $F=C-(C-D)*(A/B)$, where F is a dynamic priority, C is an initial priority and is within a first priority range, D is a highest priority within the first priority range, A is a successive allocation failure count, B is a maximum threshold of the successive allocation failure count, a priority of C is lower than that of D, and A is less than B. It should be noted that, in the first calculation formula, both the initial priority C and the parameter D belong to the first priority range, and a priority of D is higher than that of C. Therefore, when the quantity of successive failures is greater than 0, an eventually calculated dynamic priority of the current service is definitely greater than the initial priority.

By means of the solution provided in this embodiment of the present invention, a priority of service resource allocation in a multiple-card multiple-standby single-pass system is not only related to a fixed initial priority, but also may be related to a successive allocation failure count of a service resource, where a larger successive allocation failure count indicates that a calculated dynamic priority is higher, so as to resolve a problem that a resource still cannot be allocated to a service after multiple failures of resource allocation.

In a possible implementation manner, the current service is a service with infinite duration (such as a phone service or a data service), where a type of the service may be determined by the RRM according to attribute information carried in the service, or may be determined according to a service application type, and the initial priority of the current service is set within a priority range in which the first priority range, that is, a normal service is located. The RRM is further configured to: when any one condition in the following is met, adjust the dynamic priority of the current service to a highest priority within the first priority range.

The any one condition includes:

after the communication resource has been allocated to the current service, a single preemption time of the communication resource by another service except the current service within a preemption statistical period exceeds a first threshold, or after the communication resource has been allocated to the current service, a total preemption time of the communication resource by another service except the current service exceeds a second threshold. The preemption statistical period is a second preset time period from a time at which the preemption of the communication resource by the another service except the current service starts to a time at which the preemption ends. Specifically, after the RRM successively allocates the communication resource according to the dynamic priorities of the second service and the first service, within the preemption statistical period, when it is obtained through statistics that a single preemption time of the first service exceeds the first threshold, or when a total preemption time of the first service exceeds the second threshold, in this case, it may be regarded that the resource of the service with infinite duration can no longer be preempted; otherwise, an execution failure may be caused. Therefore, the RRM adjusts a dynamic priority of the service with infinite duration to a highest priority within the first priority range, that is, within the first priority range, no other service may have a priority higher than that of the service with infinite duration. Therefore, the communication resource can be successfully allocated to the service, so as to achieve successful execution.

It may be understood that, the preemption statistical period refers to a preset second preset time period from a time at which the preemption from the service with infinite duration starts, that is, it may be regarded that statistics is valid within the preemption statistical period, and if the time period is exceeded, it may be regarded that statistics becomes meaningless, and statistics of the previous preemption time may be reset to zero. It should be noted that, a dynamic priority range in this embodiment of the present invention includes a first priority range, a second priority range, and a third priority range, where a dynamic priority of the third priority range is less than a dynamic priority of the first priority range, and both the dynamic priority of the third priority range and the dynamic priority of the first priority range are less than a dynamic priority of the second priority range.

By means of the solution provided in this embodiment of the present invention, after a resource is allocated to a service with infinite duration in a multiple-card multiple-standby single-pass system by using a dynamic priority, after a time during which the service is preempted or interrupted by another service exceeds a particular period of time, the dynamic priority of the service can be directly increased to a higher level, to avoid a problem that the service fails to be executed because the service stays preempted or interrupted by the another service.

In a possible implementation manner, the initial priority of the current service is within a first priority range; the dynamic service adjustment parameter includes a first protection priority; and the calculating, by the RRM, the dynamic priority of the current service may be specifically: when a service protection notification for the current service is received, calculating the dynamic priority of the current service according to the obtained initial priority and the first protection priority, where the service protection notification is used to instruct to ensure that the communication resource is allocated to the current service, the first protection priority is a highest priority within the first priority range, the calculated dynamic priority of the current service is within a second priority range, and a priority corresponding to the second priority range is higher than a priority corresponding to the first priority range.

Specifically, when the RRM receives the service protection notification for the current service, it indicates that priority protection needs to be performed on the current service, that is, the dynamic priority needs to be increased. For example, the current service is a radio frequency protection task, such as PS domain protection signaling (in the prior art, the PS signaling cannot be lost, and it needs to be ensured that the radio frequency resource is allocated). In this case, the dynamic service adjustment parameter includes a first protection priority, and is mainly configured to increase a protection priority of the service. Further, specifically, the dynamic priority is calculated by using a second calculation formula, where the second calculation formula is: $F=E+(C/N)$, where F is a dynamic priority, C is an initial priority and is within a first priority range, E is a highest priority within the first priority range, and N is a natural number greater than 1. That is, a core purpose of the second calculation formula is that: for a current service whose initial priority is a first priority range (low), a dynamic priority of the current service is increased from the first priority range to the second priority range by using the second calculation formula and in combination with the first protection priority, so that priorities of normal services are lower than the first service, so as to ensure that a resource can be successfully allocated to the service for successful execution. Further, when different services all receive a service protection notification, a service with a higher initial priority has a higher calculated dynamic priority. It may be understood that, the initial priority in the second calculation formula in this embodiment of the present invention may be regarded as an initial priority of the current service, or may be regarded as an initial priority (current dynamic priority) calculated for the current service by using the first calculation formula, that is, the initial priority of the current service may also be updated dynamically, which is not specifically limited in the present invention.

By means of the solution provided in this embodiment of the present invention, a dynamic priority of a service on which radio frequency protection needs to be performed and that is in a multiple-card multiple-standby single-pass system can be directly increased to a higher level, to ensure successful execution of the service.

In a possible implementation manner, the current service is a service without a fixed start moment and with finite duration (the RRM may perform determining according to attribute information carried in the service, or may perform determining according to a service application type); the dynamic service adjustment parameter includes a protection removal priority; and a specific process of calculating the dynamic priority of the current service by the RRM is: calculating the dynamic priority of the current service according to the obtained initial priority and the protection removal priority, where the initial priority of the current service is within a first priority range, the protection removal priority is a lowest priority within the first priority range, the calculated dynamic priority of the current service is within a third priority range, and a priority corresponding to the third priority range is lower than a priority corresponding to the first priority range.

Specifically, because an initial priority of the service without a fixed start moment and with finite duration (such as a group broadcast service or a measurement report service that does not strictly require a service execution time) is within the first priority range, and an execution moment of the task is not strictly required, if resources are insufficient currently, execution of the service may be postponed appropriately. In this case, the dynamic service adjustment parameter may include a protection removal priority, and the RRM reduces the dynamic priority of the service to the third priority range according to the obtained initial priority and the protection removal priority, so that when a service conflict occurs between the service and another service, because a priority of the service has been reduced to a lower range, an opportunity of resource allocation may be reserved for another service with a fixed start moment, so as to properly use the communication resource. Further, the dynamic service adjustment parameter further includes a successive allocation failure count, and after the RRM calculates a first preset time period of the dynamic priority of the first service by using a third calculation formula and according to the obtained initial priority and the first protection removal priority, if the dynamic priority of the first service always stays in a low state, no resource can be allocated to the service and the execution of the service fails. Therefore, after the priority is reduced within an appropriate time period, the priority of the service needs to be restored to a normal state, that is, the RRM calculates the dynamic priority of the first service by using the first calculation formula and according to the obtained initial priority of the first service and the successive allocation failure count. For specific content of the first calculation formula, refer to other descriptions in the embodiments of the present invention, and details are not described herein again.

By means of the solution provided in this embodiment of the present invention, a service without a fixed start moment in a multiple-card multiple-standby single-pass system is decreased to a particular level within a preset time period, and a resource may be preferentially allocated to a service that is with a fixed moment and that may have a service conflict. Further, in the multiple-card multiple-standby single-pass system, after a preset time period, a service that is without a fixed start moment and on which service protection removal is performed is restored to a normal dynamic priority state, so that a resource may also be successfully allocated to the service.

In a possible implementation manner, when the RRM determines that the current service is a periodic service (the RRM may perform determining according to attribute information carried in the service, or may perform determining according to a service application type), because the periodic service is different from a normal service, that is, service application is performed for the periodic service for only once, the RRM performs allocation according to multiple single services at fixed moments, and after a service times out and is released or is successfully executed, a single service after a next single service is generated. For example, a paging service needs a radio frequency resource at each fixed moment, and therefore may be regarded as a periodic service. Specifically, the RRM receives an execution start time and an execution period (in the prior art, a related scheduling module also performs service application at an adjacent moment) of a periodic service that are sent by a related modem; and after the RRM receives a service request of the periodic service (the periodic service includes services at multiple time points, and an interval between services at adjacent time points is a period of the periodic service), a specific process of calculating the dynamic priority of the periodic service by the RRM is: calculating a dynamic priority of a service at an $M^{th}$ time point according to the initial priority of the current service and a successive allocation failure count of a service between a first time point and an $(M-2)^{th}$ time point, where an interval between the $(M-2)^{th}$ time point and the Mt time point is two periods of the periodic service, and M is a natural number greater than 3. When the successive allocation failure count of the service between the first time point and the $(M-2)^{th}$ time point is 0, the calculated dynamic priority of the service at the $M^{th}$ time point is equal to an initial priority of the periodic service; or when the successive allocation failure count of the service between the first time point and the $(M-2)^{th}$ time point is greater than 0, the calculated dynamic priority of the service at the $M^{th}$ time point is higher than the initial priority, and the dynamic priority increases with the increase of the successive allocation failure count.

It is assumed that the periodic service currently performs a service request of the periodic service at the seventh time point. In this case, the RRM needs to calculate a dynamic priority of a service at the seventh (M is 7) time point, and allocate a communication resource to the service according to the dynamic priority, so that the RRM needs to calculate the dynamic priority according to a successive allocation failure count of five services from the service at the first time point (a service at a start time point) to the service at the fifth (7−2=5) time point. The reason lies in that in this embodiment of the present invention, after the RRM receives the service request of the periodic service, inside the RRM, service requests of two services with a fixed moment and finite duration are simulated, that is, service requests at the first time point and the second time point. In this case, dynamic priorities of services at the first time point and the second time point are the same as the initial priority of the periodic service. Because application is made for both the services at the first time point and the second time point for the first time, no previous successive allocation failure count may be used as reference factors for calculation of the dynamic priority. When the service at the first time point is executed successfully or application for a resource to be allocated fails (an execution failure), a service at the third time point is generated (in this case, because a resource application time of the service at the second time point is not reached, application for the resource of the service at this time point is not started, that is, a dynamic priority of the service at the third time point is only related to a resource allocation failure count of services at the first time point), and after the service at the second time point is executed successfully or the application for a resource to be allocated fails, service application of a periodic service after a next periodic service (that is, a service at the fourth time point) is immediately generated. In this way, a dynamic priority of a service at the $M^{th}$ time point is always related to a successive allocation failure count of a service between the first time point and the (M−2)$^{th}$ time point. It should be noted that, when a service that is between the first time point and the (M−2)$^{th}$ time point is executed successfully (that is, when a resource is successfully allocated), the successive allocation failure count is reset to zero, and calculation starts from a next application failure. In this way, the process is repeated, and for calculation of dynamic priorities of services at more time points, refer to the foregoing embodiments, and details are not described herein again.

By means of the solution provided in this embodiment of the present invention, for a periodic service in a multiple-card multiple-standby single-pass system, when a resource fails to be allocated to a periodic service at one time point, a dynamic priority can be increased appropriately for a periodic service at a time point after a next time point of the time point, so that a resource can be successfully allocated to the periodic service.

It may be further understood that, in the embodiments of the present invention, when the RRM determines that resource allocation of the current service fails, a successive allocation failure parameter A in the dynamic service adjustment parameter is increased by 1; and when the RRM determines that a resource is successfully allocated to the current service, the successive allocation failure parameter in the dynamic service adjustment parameter is reset to zero.

In the embodiments of the present invention, a communications terminal is provided, including a RF system and a baseband processor, where the baseband processor is connected to the RF system; the baseband processor includes: a RRM and at least two modems; and the RRM is configured to: when determining that currently a conflict exists between a first service and a second service, compare a first dynamic priority of the first service with a second dynamic priority of the second service to allocate a communication resource to one of the first service and the second service; the at least two modems include a first modem and a second modem, where the first modem is configured to process a first service of a first subscriber identity module SIM card, the second modem is configured to process a second service of a second SIM card, the first service and the second service are configured to preempt a communication resource, each of the first service and the second service is a current service, and the RRM is further configured to calculate a dynamic priority of the current service according to an initial priority of the current service and a dynamic service adjustment parameter. The communications terminal provided in the present invention resolves a problem in the prior art that improper resource allocation is easily caused because a multiple-card multiple-standby single-pass system allocates a communication resource according to only a principle of performing allocation by using an initial fixed priority of a service, and avoids a problem such as a call drop or a network disconnection because no resource is allocated to the service for a long time, thereby improving user experience.

To help understand the solution of the embodiments of the present invention, the following provides detailed description with reference to multiple specific application scenarios. However, it may be understood that, the present invention is not limited to the following application scenarios. In a specific application scenario, a dynamic priority range of a service may be divided into three levels: it is assumed that a smaller priority value indicates a higher priority. For example:

1) a second priority range (high priority): 1 to 99, applicable to service radio frequency protection (the service radio frequency protection refers to that it is ensured for some special services that radio frequency can be allocated to the services);

2) a first priority range (medium priority): 100 to 900, where 200 to 900 are an initial dynamic priority range of a service, and may be specified to a unit of 10, and 100 is a maximum value calculated according to a dynamic priority. It should be noted that, the initial priority of the service is set to 200 to 900, and the reason lies in that in combination with a first calculation formula, both a parameter C and a parameter D belong to the first priority range, and a calculated dynamic priority range is also within the first priority range. That is, a dynamic priority of a normal service is limited to the first priority range by using the calculation formula, so that in a process of radio frequency protection (increased to the second priority range) or protection removal (decreased to the third priority range), effects of protection and protection removal can be achieved; and 3) the third priority range (low priority): 920 to 1000, which are values of a service without a fixed start moment within a period of time range before application.

For calculation of a dynamic priority for service application, to make a priority of a service dynamically adjustable, during service application, in addition to the original initial priority (ApplyPriority range is within 200 to 900) of the service, two parameters, that is, a successive allocation failure count (FailCnt) and a maximum value threshold B of a total allocation failure count (FailThd) are particularly added. The resource allocation module calculates a dynamic priority F (SchdlPriority) of the service before each time of overall scheduling, and the formula is as follows, where SchdlPriorityMax is a maximum value D of a dynamic priority, and is a fixed parameter, and the first calculation formula is $$SchdlPriority = ApplyPriority - (ApplyPriority - SchdlPriorityMax) * (FailCnt / FailThd).$$

Figure 3:
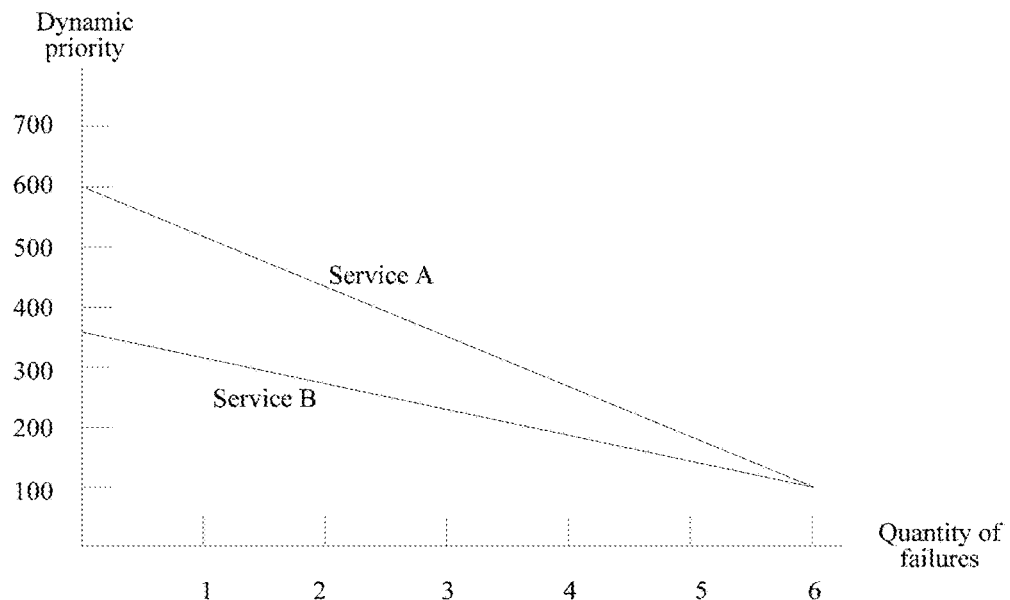
FIG. 3 is a schematic diagram of a specific application scenario of a resource allocation method according to an embodiment of the present invention.

FIG. 3 is a change trend of dynamic priorities of a service A whose initial priority is 600 and a service B whose initial priority is 400 when the successive allocation failure count changes from 0 to 6.

1. For services with a same initial priority, the priorities of the services gradually increase with an increase of a failure count.

Figure 4:
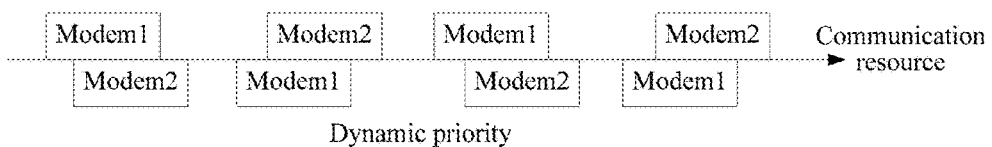
FIG. 4 is a schematic diagram of another specific application scenario of a resource allocation method according to an embodiment of the present invention.

2. For services with different priorities, if failure thresholds of the services are the same, when failure counts are the same, a priority of the service B with a higher priority is still higher than that of the service A. When application to the resource allocation module is made for the first time, FailCnt=0, and after allocation to the service fails, the resource allocation module informs a corresponding modem, and the modem keeps count of FailCnt of the corresponding service, and carried FailCnt is increased when application is made a next time. The resource allocation module performs calculation according to a formula, so as to increase SchdlPriority. If still no resource is allocated, the modem continues to add 1 to FailCnt of the corresponding service. After allocation to the service succeeds, the corresponding modem is informed, and the modem resets FailCnt to zero, and the resource allocation module performs calculation again by using the formula, so as to restore the dynamic priority to an application value. For example, if a modem 1 and a modem 2 reside on a same cell and separately have a paging service (assuming that another service is not considered temporarily) that needs to use a radio frequency resource, the modem 1 and the modem 2 simultaneously make application for the paging service. Priorities of services in a same mode such as a mode G are the same. It is assumed that an initial priority ApplyPriority of the paging service is 500, the total allocation failure count FailThd is 5, and the successive allocation failure count FailCnt is 0. A specific procedure is as follows:

1. Application paging service parameters of the modem 1 are: ApplyPriorityM1=500, FailThdM1=5, and Fail-CntM1=0; and application paging service parameters of the modem 2 are: ApplyPriorityM2=500, FailThdM2=5, and FailCntM2=0;

2. after a service application of each mode is received, the RRM calculates priorities scheduled by the RRM: SchdlPriorityM1=500−(500−100)*(0/5)=500, and SchdlPriorityM2=500−(500−100)*(0/5)=500;

3. because the two priorities are the same, the RRM performs allocation according to a sequence of the modems (SIM cards) (according to a sequence from the modem 1 to the modem 2), that is, the RRM preferentially allocates a resource to the modem 1, and informs the modem 2 of a failure of allocation to the modem 2; in this case, the modem 2 adds 1 to the parameter FailCntM2 of the modem 2 according to the failure of allocation;

4. at a next paging position, the modem 1 and the modem 2 simultaneously make application for a service, where application paging service parameters of the modem 1 are: ApplyPriorityM1=500, FailThdM1=5, and FailCntM1=0; and application paging service parameters of the modem 2 are: ApplyPriorityM2=500, FailThdM2=5, and FailCntM2=1;

5. after receiving a service application of each mode, the RRM calculates priorities scheduled by the RRM: SchdlPriorityM1=500−(500−100)*(0/5)=500, and SchdlPriorityM2=500−(500−100)*(1/5)=420;

6. because a priority of the modem 2 is higher than that of the modem 1, the RRM preferentially allocates a resource to the modem 2, and informs the modem 1 of a failure of allocation to the modem 1, the modem 1 adds 1 to a parameter FailCntM1 of the modem 1 according to the allocation failure, and the modem 2 resets a corresponding value FailCntM2 to zero because allocation succeeds;

7. at a next paging position, the modem 1 and the modem 2 simultaneously make application for a service; application paging service parameters of the modem 1 are: ApplyPriorityM2=500, FailThdM2=5, and FailCntM2=1; and application paging service parameters of the modem 2 are: ApplyPriorityM1=500, FailThdM1=5, and FailCntM1=0; and 8. after a service application in each mode is received, the RRM calculates priorities scheduled by the RRM, and allocates a service SchdlPriorityM1=500−(500−100)*(1/5) =420 to the modem 1 and SchdlPriorityM2=500−(500−100) *(0/5)=500 to the modem 2; therefore, as shown in FIG. 4, the communication resource may be used cyclically by the modem 1 and the modem 2.

In another specific application scenario, when a service type is a service without a fixed start moment, within a period of time such as 50 ms before application is made for the service without a fixed start moment, a priority of the service is within a low priority range, and it is ensured as much as possible that a resource is preferentially allocated to a service with a fixed start moment, that is, a third calculation formula in this embodiment of the present invention is used, and is specifically as follows:

$$\text{SchdlPriority}=\text{ApplyPriortyMin}+\text{ApplyPriority}/10,$$
where

ApplyPriortyMin is a lowest priority 1000 within all priority ranges. After the period of time 50 ms, the dynamic priority of the service is recalculated according to the first calculation formula, and is kept between 100 and 900.

In still another specific application scenario, when a type of a service is a radio frequency protection service for priority processing, the service sends a radio frequency protection message during PS signaling protection of a call service (PS signaling cannot be lost, and it needs to be ensured that a radio frequency can be allocated), and the resource allocation module increases a priority of a service corresponding to a modem to a radio frequency protection range (21 to 91). RF Protect may be performed on multiple modems, and to distinguish priorities of multiple radio frequency protection services, fine adjustment is performed on a dynamic priority of the service by using an application value of the dynamic priority, that is, a second calculation formula in this embodiment of the present invention is used, which is specifically as follows:

$$\text{SchdlPriority}=\text{SchdlPriorityHighest}+\text{ApplyPriority}/10, \text{ where}$$

an application range of ApplyPriority is 200 to 900, and a value of SchdlPriorityHighest is 1; therefore, when radio frequency protection is performed, a range of calculated dynamic priorities is 21 to 91.

If radio frequency protection is performed on both the modems, for example, an initial priority of the modem 1 is 300, and an initial priority of the modem 2 is 500, it may be calculated that the scheduled SchdlPriorityM1 is 31, and the scheduled SchdlPriorityM2 is 51. Although radio frequency protection is performed on both the modems, the dynamic priorities are increased to a high priority range, but are still distinguished according to the application values of the dynamic priorities.

Figure 5:
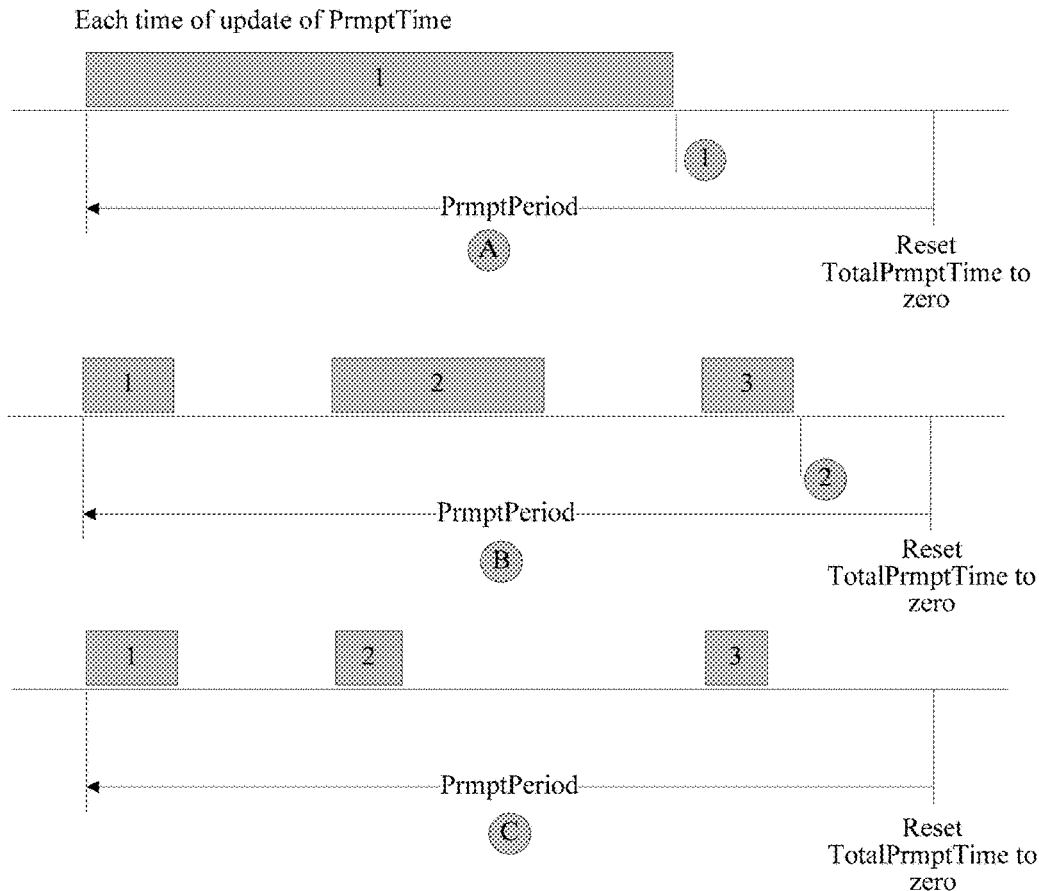
FIG. 5 is a schematic diagram of still another specific application scenario of a resource allocation method according to an embodiment of the present invention.

In yet another specific application scenario, as shown in FIG. 5, when the first service is a service with infinite duration, the service carries a single preemption time PrmptTimeThd, a total preemption time TotalPrmptTimeThd, and a preemption statistical period PrmptPeriod, which are used to calculate a point at which the priority of the service is increased to a maximum value 100, and at the point, allocation may be preferentially performed on the service.

For example, the service with infinite duration is a data service. Due to a relatively low priority of the data service, the data service may be interrupted multiple times. However, to prevent the service from being interrupted all the time, three parameters are set:
a single preemption time PrmptTimeThd;
a total preemption time TotalPrmptTimeThd; and
a preemption statistical period PrmptPeriod.

When a particular condition is met, a priority of the data service is increased to 100 (that is, a maximum value besides a radio frequency protection value), and allocation to a PS service may be performed thereafter.

For example, PrmptPeriod=200 ms; PrmptTimeThd=60 ms; and

TotalPrmptTimeThd=100 ms; in addition, three parameters: a preemption moment PrmptStartPos, a total interruption time TotalPrmptTime, and a single interruption time PrmptTime, are set for intermediate calculation.

When the data service is interrupted, a current moment is assigned as a value to PrmptPos, and an entire preemption period PrmptPosInPeriod also starts to be timed. When preemption ends, a current PrmptTime=PrmptEndPos−PrmptStartPos is recorded according to an end moment PrmptEndPos.

When scheduling is started each time, whether a time from the current time to PrmptPosInPeriod exceeds Prmpt- Period is determined; if the time exceeds PrmptPeriod, the total preemption time is reset to zero.

If PrmptTime>=PrmptTimeThd or TotalPrmptTime>=TotalPrmptTimeThd, a PS priority is increased to 100.

If TotalPrmptTime<TotalPrmptTimeThd, a service priority is kept unchanged, and TotalPrmptTime+=PrmptTime.

When interruption is performed again, the preemption moment and the end moment are updated, and PrmptTime and TotalPrmptTime are calculated.

In conclusion, there are there cases in total:

As shown by A in FIG. 5, the single preemption time exceeds the single preemption threshold, so that a priority at a position $\sqrt[3]{}$ is increased to 100.

As shown by B in FIG. 5, the single preemption time is short, but because preemption is performed multiple times within a preemption period, the total preemption time exceeds TotalPrmptTimeThd, and a priority at a position $\sqrt[3]{}$ is increased to 100.

As shown by C in FIG. 5, although preemption is performed multiple times, the preemption time is short and is insufficient to increase a priority of the service. The preemption time in the three figures is reset to zero when PrmptPeriod ends.

Figure 6:
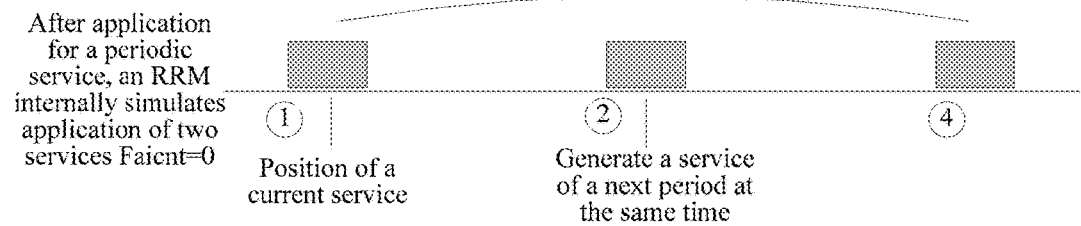
FIG. 6 is a schematic diagram of yet another specific application scenario of a resource allocation method according to an embodiment of the present invention.

In yet another specific application scenario, as shown in FIG. 6, when the first service is a periodic service, because the periodic service applies for a resource only once, the RRM performs allocation according to that the period service is a single service having multiple fixed start moments. After the service times out and is released or is successfully executed, a single service (time point service) after a next single service is generated.

A paging service needs a radio frequency resource at each fixed position, and therefore, the paging service may be regarded as a periodic service to apply for the radio frequency resource. If allocation fails for the single service of the periodic service, FailCnt counting is performed inside the resource allocation module, and a priority of the single service in subsequent allocation is affected.

After the RRM receives application for the periodic service, the RRM internally simulates that application content of two services that are equivalent to the periodic service and that have fixed moment and with finite duration separately needs to use resources at positions $\sqrt[3]{}$ and $\sqrt[3]{}$. If service allocation at $\sqrt[3]{}$ fails, a service application of using a radio frequency resource at $\sqrt[3]{}$ is directly generated, and a time point service at $\sqrt[3]{}$ is calculated by using the Failcnt being 1. For a specific calculation formula, refer to the first calculation formula. Compared with the single service, in the periodic service, there is no interaction between the RRM and the modem, and for each modem, implementation is simpler. For more specific implementation details and more actual application scenarios, refer to the foregoing method embodiments in FIG. 1 and FIG. 2, and details are not described herein again.

Figure 7:
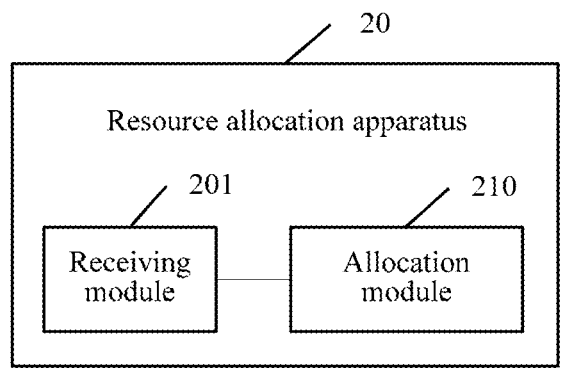
FIG. 7 is a schematic structural diagram of a resource allocation apparatus according to an embodiment of the present invention.

Referring to FIG. 7, a schematic structural diagram of a resource allocation apparatus in an embodiment of the present invention is described in detail. The apparatus 20 is applied to a terminal including a RF system and a baseband processor, and specifically may be applied to a baseband processor 12 of a communications terminal 10 in FIG. 1, or be used as some functional modules in a RRM 123 of the baseband processor 12 to complete related functions such as resource scheduling and allocation of a service. The apparatus 20 may include: a receiving module 201 and an allocation module 210.

The baseband processor includes the RRM and at least two modems, and the at least two modems include a first modem and a second modem.

The receiving module 201 is configured to receive a service request that is of a first service and that is initiated by the first modem, where the first modem is configured to process a first service of a first subscriber identity module SIM card.

The allocation module 210 is configured to: when determining that there currently exists a second service that is initiated by the second modem and that is in a conflict with the first service in preempting a communication resource, compare a first dynamic priority of the first service with a second dynamic priority of the second service to allocate the communication resource to one of the first service and the second service, where the second modem is configured to process the second service of a second SIM card, the communication resource includes a resource formed by the RF system, each of the first service and the second service is a current service, a dynamic priority of the current service is calculated by the RRM according to an initial priority of the current service and a dynamic service adjustment parameter.

Figure 8:
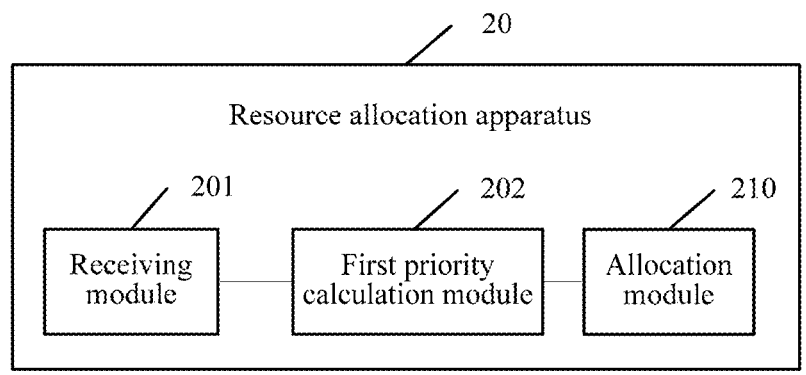
FIG. 8 is a schematic structural diagram of another embodiment of a resource allocation apparatus according to the present invention.

Specifically, as shown in FIG. 8, which is a schematic structural diagram of another embodiment of a resource allocation apparatus provided in the present invention, the resource allocation apparatus 20 may further include: a first priority calculation module 202.

The dynamic service adjustment parameter includes a successive allocation failure count, the successive allocation failure count refers to a quantity of successive failures in applying for the communication resource to be allocated to the current service, and upon a success in applying for the communication resource to be allocated, the successive allocation failure count is reset to zero.

The first priority calculation module 202 is configured to: when determining that the current service meets any one condition in the following, calculate, the dynamic priority of the current service according to the initial priority of the current service and the successive allocation failure count, where when the successive allocation failure count is 0, the calculated dynamic priority is equal to the initial priority; or when the successive allocation failure count is greater than 0, the calculated dynamic priority is higher than the initial priority, and the dynamic priority increases with the increase of the successive allocation failure count.

The any one condition includes:

the current service is a service with a fixed start moment, or a service without a fixed start moment and with infinite duration; or the current service is a service without a fixed start moment and with finite duration, and the dynamic priority of the current service remains within a third priority range within a first preset time period after a service request is initiated, where the initial priority of the current service is within a first priority range, and a priority corresponding to the third priority range is lower than a priority corresponding to the first priority range; or when the dynamic priority of the current service is within a second priority range, and the RRM receives a service protection removal notification for the current service, where the service protection removal notification instructs to adjust the dynamic priority of the current service from the second priority range to a first priority range, and a priority corresponding to the second priority range is higher than a priority corresponding to the first priority range.

Figure 9:
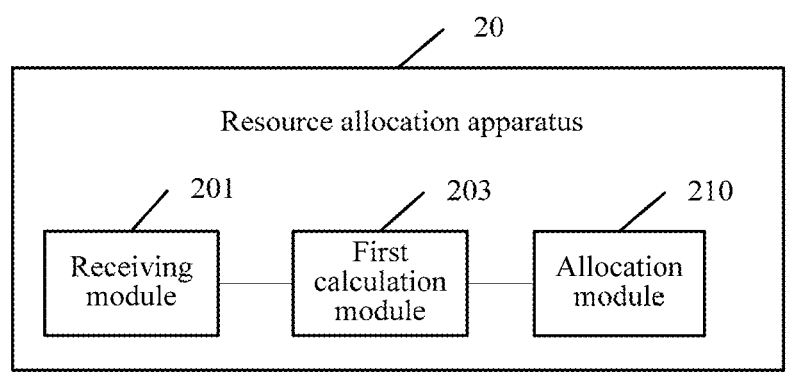
FIG. 9 is a schematic structural diagram of still another embodiment of a resource allocation apparatus according to the present invention.

Further, as shown in FIG. 9, which is a schematic structural diagram of still another embodiment of a resource allocation apparatus provided in the present invention, the resource allocation apparatus 20 may further include: a first calculation module 203.

The first calculation module 203 is configured to calculate the first dynamic priority according to a first calculation formula, where the first calculation formula is: $F=C-(C-D)*(A/B)$, where F is a dynamic priority, C is an initial priority and is within a first priority range, D is a highest priority within the first priority range, A is a successive allocation failure count, B is a maximum threshold of the successive allocation failure count, a priority of C is lower than that of D, and A is less than B.

Figure 10:
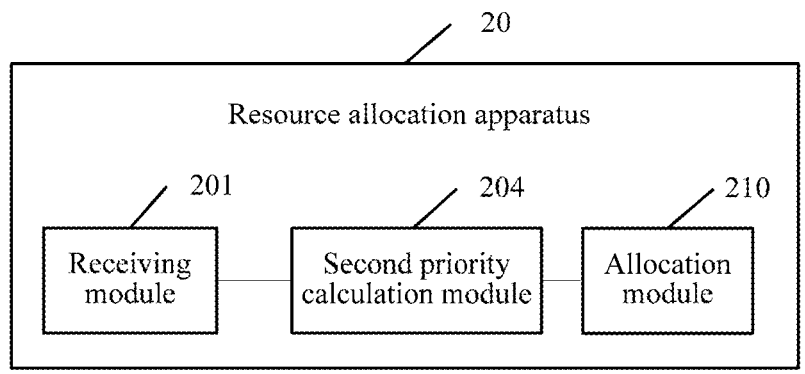
FIG. 10 is a schematic structural diagram of yet another embodiment of a resource allocation apparatus according to the present invention.

Further, as shown in FIG. 10, which is a schematic structural diagram of still another embodiment of a resource allocation apparatus provided in the present invention, the resource allocation apparatus 20 may further include: a second priority calculation module 204.

The current service is a service with infinite duration.

The second priority calculation module 204 is configured to: when any one condition in the following is met, adjust the dynamic priority of the current service to a highest priority within a first priority range, where the initial priority of the current service is within the first priority range.

The any one condition includes:

after the communication resource has been allocated to the current service, a single preemption time of the communication resource by another service except the current service within a preemption statistical period exceeds a first threshold, where the preemption statistical period is a second preset time period from a time at which the preemption of the communication resource by the another service except the current service starts to a time at which the preemption ends; or after the communication resource has been allocated to the current service, a total preemption time of the communication resource by another service except the current service exceeds a second threshold.

Figure 11:
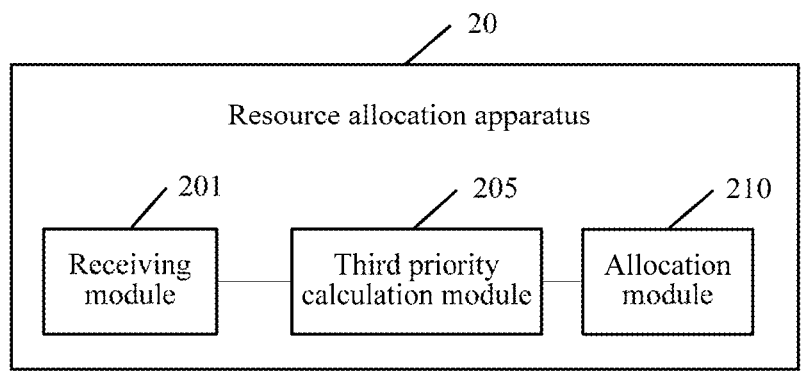
FIG. 11 is a schematic structural diagram of yet another embodiment of a resource allocation apparatus according to the present invention.

Further, as shown in FIG. 11, which is a schematic structural diagram of still another embodiment of a resource allocation apparatus provided in the present invention, the resource allocation apparatus 20 may further include: a third priority calculation module 205.

The initial priority of the current service is within a first priority range, and the dynamic service adjustment parameter includes a first protection priority.

The third priority calculation module 205 is configured to: when a service protection notification for the current service is received, calculate the dynamic priority of the current service according to the obtained initial priority and the first protection priority, where the service protection notification is used to instruct to ensure that the communication resource is allocated to the current service, the first protection priority is a highest priority within the first priority range, the calculated dynamic priority of the current service is within a second priority range, and a priority corresponding to the second priority range is higher than a priority corresponding to the first priority range.

Figure 12:
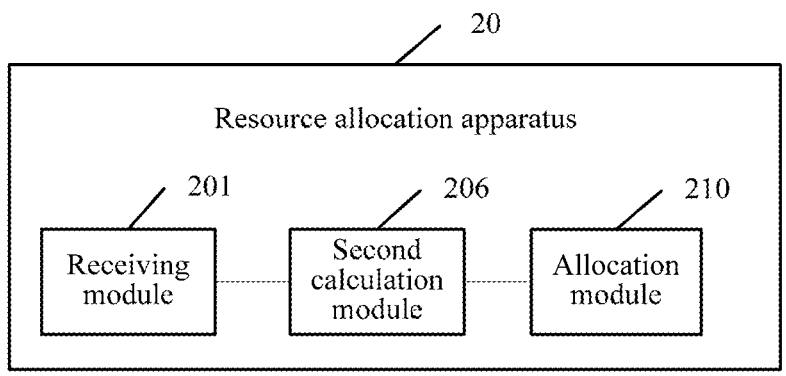
FIG. 12 is a schematic structural diagram of yet another embodiment of a resource allocation apparatus according to the present invention.

Further, as shown in FIG. 12, which is a schematic structural diagram of still another embodiment of a resource allocation apparatus provided in the present invention, the resource allocation apparatus 20 may further include: a second calculation module 206.

The second calculation module 206 is configured to: when a service protection notification for the current service is received, calculate the dynamic priority of the current service according to a second calculation formula, where the service protection notification is used to instruct to ensure that the communication resource is allocated to the current service, and the second calculation formula is: $F=E+(C/N)$, where F is a dynamic priority, C is an initial priority and is within a first priority range, E is a highest priority within the first priority range, and N is a natural number greater than 1.

Figure 13:
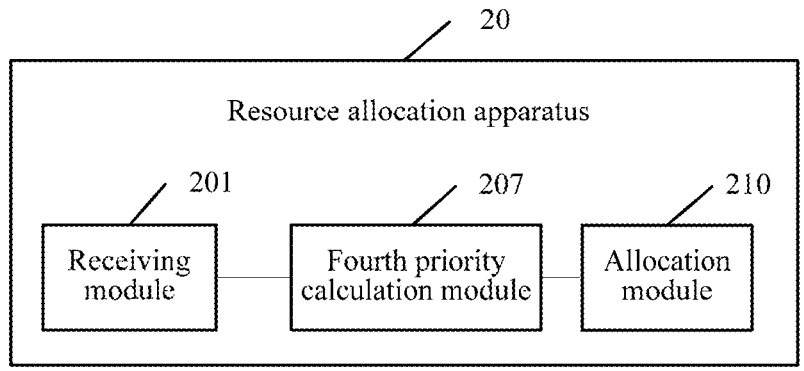
FIG. 13 is a schematic structural diagram of yet another embodiment of a resource allocation apparatus according to the present invention.

Further, as shown in FIG. 13, which is a schematic structural diagram of still another embodiment of a resource allocation apparatus provided in the present invention, the resource allocation apparatus 20 may further include: a fourth priority calculation module 207.

The current service is a service without a fixed start moment and finite duration, and the dynamic service adjustment parameter includes a protection removal priority The fourth priority calculation module 207 is configured to calculate the dynamic priority of the current service according to the obtained initial priority and the protection removal priority, where the initial priority of the current service is within a first priority range, the protection removal priority is a lowest priority within the first priority range, the calculated dynamic priority of the current service is within a third priority range, and a priority corresponding to the third priority range is lower than a priority corresponding to the first priority range.

The calculated dynamic priority increases with the increase of the initial priority of the current service.

Figure 14:
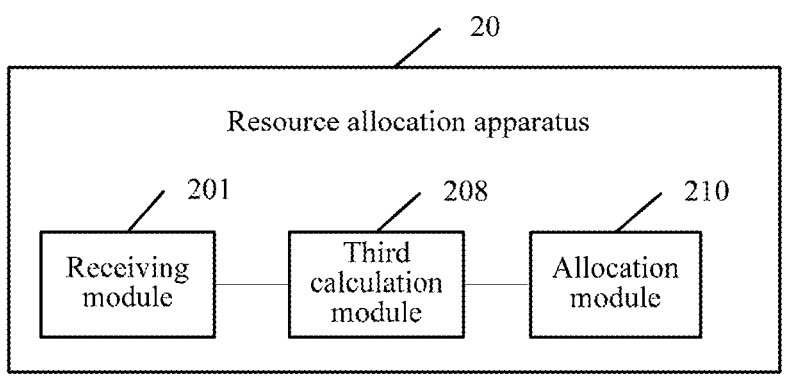
FIG. 14 is a schematic structural diagram of yet another embodiment of a resource allocation apparatus according to the present invention.

Further, as shown in FIG. 14, which is a schematic structural diagram of still another embodiment of a resource allocation apparatus provided in the present invention, the resource allocation apparatus 20 may further include: a third calculation module 208.

The current service is a service without a fixed start moment and with finite duration.

The third calculation module 208 is configured to calculate the dynamic priority of the current service according to a third calculation formula, where the third calculation formula is: $F=E+(C/N)$, where F is a dynamic priority, C is an initial priority and is within a first priority range, E is a lowest priority within the first priority range, and N is a natural number greater than 1.

Figure 15:
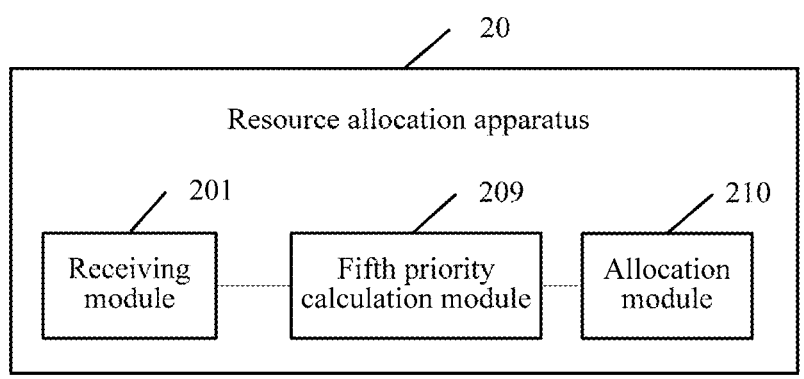
FIG. 15 is a schematic structural diagram of yet another embodiment of a resource allocation apparatus according to the present invention.

Further, as shown in FIG. 15, which is a schematic structural diagram of still another embodiment of a resource allocation apparatus provided in the present invention, the resource allocation apparatus 20 may further include: a fifth priority calculation module 209.

The current service is a periodic service, the periodic service includes services at multiple time points, and an interval between services at adjacent time points is a period of the periodic service; and the apparatus further includes:

a fifth priority calculation module 209, configured to calculate a dynamic priority of a service at an $M^{th}$ time point according to the initial priority of the current service and a successive allocation failure count of a service between a first time point and an $(M-2)^{th}$ time point, where an interval between the $(M-2)^{th}$ time point and the $M^{th}$ time point is two periods of the periodic service, and M is a natural number greater than 3, where when the successive allocation failure count of the service between the first time point and the $(M-2)^{th}$ time point is 0, the calculated dynamic priority of the service at the $M^{th}$ time point is equal to an initial priority of the periodic service; or when the successive allocation failure count of the service between the first time point and the $(M-2)^{th}$ time point is greater than 0, the calculated dynamic priority of the service at the $M^{th}$ time point is higher than the initial priority, and the dynamic priority increases with the increase of the successive allocation failure count.

This embodiment of the present invention provides the resource allocation apparatus, applied to a multiple-card multiple-standby single-pass system terminal including a RF system and a baseband processor, where the apparatus includes: the receiving module and the allocation module, where the receiving module is configured to receive a service request that is of a first service and that is initiated by a first modem; and the allocation module is configured to: when determining that there currently exists a second service that is initiated by a second modem and that is in a conflict with the first service in preempting a communication resource, compare a first dynamic priority of the first service with a second dynamic priority of the second service to allocate the communication resource to one of the first service and the second service. The resource allocation apparatus provided in the present invention resolves a problem in the prior art that improper resource allocation is easily caused because a multiple-card multiple-standby single-pass system allocates a communication resource according to only a principle of performing allocation by using an initial fixed priority of a service, and avoids a problem such as a call drop or a network disconnection because no resource is allocated to the service for a long time, thereby improving user experience.

It may be understood that, for functions of the modules in the resource allocation apparatus 20, refer to specific implementation manners of the foregoing communications terminal and method embodiment in FIG. 1 and FIG. 2, and details are not described herein again.

It should be noted that, the foregoing method embodiment of the present invention may be further applied to various types of processors, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logical device, a discrete gate or transistor logic device, or a discrete hardware component. The processor may implement or execute methods, steps and logical block diagrams disclosed in the embodiments of the present invention. The general-purpose processor may be a microprocessor, or the processor may further be any conventional processor, or the like. Steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that, the memory in this embodiment of the present invention may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. It is described as an example but not a limitation, many forms of RAMs, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM), may be used. It should be noted that, the memory of the system and the method described in this specification includes, but is not limited to, these and any other suitable types of memories.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described.

An embodiment of the present invention further provides a computer storage medium, where the computer storage medium may store a program, and when the program is executed, a part or all of the steps in the resource allocation method recorded in the method embodiment are performed.

In the foregoing embodiments, the description of each embodiment has respective focuses. For a part that is not described in detail in an embodiment, reference may be made to related descriptions in other embodiments.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are exemplary embodiments, and the related actions and modules are not necessarily mandatory to the present invention.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual connections or direct couplings may be implemented through some interfaces. The indirect couplings or communication connections between the apparatuses or units may be implemented in electronic or other forms, which are not limited to connections directly by using conducting wires.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, and may be specifically a processor in a computer device) to perform all or a part of the steps of the foregoing methods described in the embodiments of the present invention. The foregoing storage medium includes: any medium that can store program code, such as a USB flash drive, a removable hard disk, a magnetic disk, an optical disc, a read-only memory (English: Read-Only Memory, ROM for short), or a random access memory (English: Random Access Memory, RAM for short).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A communications terminal, comprising a radio frequency (RF) system and a baseband processor, wherein the baseband processor is connected to the RF system, the baseband processor comprises: a radio resource manager (RRM) and at least two modems, and the at least two modems comprise a first modem and a second modem;
   the first modem is configured to process a first service of a first subscriber identity module (SIM) card;
   the second modem is configured to process a second service of a second SIM card; and
   the RRM is configured to:
   receive a service request that is of the first service and that is initiated by the first modem;
   receive a service request that is of the second service and that is initiated by the second modem, wherein the first service and the second service are configured to preempt a communication resource; and
   when determining that currently a conflict exists between the first service and the second service, compare a first dynamic priority of the first service with a second dynamic priority of the second service to allocate the communication resource to one of the first service and the second service, wherein the communication resource comprises a resource formed by the RF system, each of the first service and the second service is a current service, and the RRM is further configured to calculate a dynamic priority of the current service according to an initial priority of the current service and a dynamic service adjustment parameter.

2. The terminal according to claim 1, wherein the RF system comprises a radio frequency integrated circuit (RFIC), and the RFIC is configured to modulate or demodulate an RF signal related to a service processed by any one of the at least two modems.

3. The terminal according to claim 2, wherein the RF system further comprises an antenna and a radio frequency front end (RFFE), the antenna is connected to the RFFE, the RFFE is connected to the RFIC, and the RFFE receives or sends the RF signal using the antenna.

4. The terminal according to claim 1, wherein the dynamic service adjustment parameter comprises a successive allocation failure count, the successive allocation failure count refers to a quantity of successive failures in applying for the communication resource to be allocated to the current service, and upon a success in applying for the communication resource to be allocated, the successive allocation failure count is reset to zero; and during the calculation of the dynamic priority of the current service, the RRM is further configured to:
   when determining that the current service satisfies any one condition, calculate the dynamic priority of the current service according to the initial priority of the current service and the successive allocation failure count, wherein when the successive allocation failure count is 0, the calculated dynamic priority is equal to the initial priority; or when the successive allocation failure count is greater than 0, the calculated dynamic priority is higher than the initial priority, and the dynamic priority increases with the increase of the successive allocation failure count; and
   wherein the any one condition comprises:
   the current service is a service with a fixed start moment, or a service without a fixed start moment and with infinite duration; or
   the current service is a service without a fixed start moment and with finite duration, and the dynamic priority of the current service remains within a third priority range within a first preset time period after a service request is initiated, wherein the initial priority of the current service is within a first priority range, and a priority corresponding to the third priority range is lower than a priority corresponding to the first priority range; or
   the dynamic priority of the current service is within a second priority range, and the RRM receives a service protection removal notification for the current service, wherein the service protection removal notification instructs to adjust the dynamic priority of the current service from the second priority range to a first priority range, and a priority corresponding to the second priority range is higher than a priority corresponding to the first priority range.

5. The terminal according to claim 1, wherein during the calculation of the dynamic priority of the current service, the RRM is further configured to:
calculate the first dynamic priority according to a first calculation formula, wherein the first calculation formula is: $F=C-(C-D)*(A/B)$, wherein F is a dynamic priority, C is an initial priority and is within a first priority range, D is a highest priority within the first priority range, A is a successive allocation failure count, B is a maximum threshold of the successive allocation failure count, a priority of C is lower than that of D, and A is less than B.

6. The terminal according to claim 1, wherein the current service is a service with infinite duration, and the RRM is further configured to:
when any one condition is satisfied, adjust the dynamic priority of the current service to a highest priority within a first priority range, wherein the initial priority of the current service is within the first priority range; and
wherein the any one condition comprises:
after the communication resource has been allocated to the current service, a single preemption time of the communication resource by another service except the current service within a preemption statistical period exceeds a first threshold, wherein the preemption statistical period is a second preset time period from a time at which the preemption of the communication resource by the another service except the current service starts to a time at which the preemption ends; or
after the communication resource has been allocated to the current service, a total preemption time of the communication resource by another service except the current service exceeds a second threshold.

7. The terminal according to claim 1, wherein the initial priority of the current service is within a first priority range; the dynamic service adjustment parameter comprises a first protection priority; and during the calculation of the dynamic priority of the current service, the RRM is further configured to:
when a service protection notification for the current service is received, calculate the dynamic priority of the current service according to the obtained initial priority and the first protection priority, wherein the service protection notification is used to instruct to ensure that the communication resource is allocated to the current service, the first protection priority is a highest priority within the first priority range, the calculated dynamic priority of the current service is within a second priority range, and a priority corresponding to the second priority range is higher than a priority corresponding to the first priority range.

8. The terminal according to claim 1, wherein during the calculation of the dynamic priority of the current service, the RRM is further configured to:
when a service protection notification for the current service is received, calculate the dynamic priority of the current service using a second calculation formula, wherein the service protection notification is used to instruct to ensure that the communication resource is allocated to the current service, and the second calculation formula is: $F=E+(C/N)$, wherein F is a dynamic priority, C is an initial priority and is within a first priority range, E is a highest priority within the first priority range, and N is a natural number greater than 1.

9. The terminal according to claim 1, wherein the current service is a service without a fixed start moment and with finite duration; the dynamic service adjustment parameter comprises a protection removal priority; and during the calculation of the dynamic priority of the current service, the RRM is further configured to:
calculate the dynamic priority of the current service according to the obtained initial priority and the protection removal priority, wherein the initial priority of the current service is within a first priority range, the protection removal priority is a lowest priority within the first priority range, the calculated dynamic priority of the current service is within a third priority range, and a priority corresponding to the third priority range is lower than a priority corresponding to the first priority range.

10. The terminal according to claim 1, wherein the current service is a service without a fixed start moment and with finite duration; and during the calculation of the dynamic priority of the current service, the RRM is further configured to:
calculate the dynamic priority of the current service according to a third calculation formula, wherein the third calculation formula is: $F=E+(C/N)$, wherein F is a dynamic priority, C is an initial priority and is within a first priority range, E is a lowest priority within the first priority range, and N is a natural number greater than 1.

11. The terminal according to claim 1, wherein the current service is a periodic service, the periodic service comprises services at multiple time points, and an interval between services at adjacent time points is a period of the periodic service; and the RRM is further configured to:
calculate a dynamic priority of a service at an $M^{th}$ time point according to the initial priority of the current service and a successive allocation failure count of a service between a first time point and an $(M-2)^{th}$ time point, wherein an interval between the $(M-2)^{th}$ time point and the $M^{th}$ time point is two periods of the periodic service, and M is a natural number greater than 3, wherein when the successive allocation failure count of the service between the first time point and the $(M-2)^{th}$ time point is 0, the calculated dynamic priority of the service at the $M^{th}$ time point is equal to an initial priority of the periodic service; or when the successive allocation failure count of the service between the first time point and the $(M-2)^{th}$ time point is greater than 0, the calculated dynamic priority of the service at the $M^{th}$ time point is higher than the initial priority, and the dynamic priority increases with the increase of the successive allocation failure count.

12. A resource allocation method, applied to a terminal comprising a radio frequency (RF) system and a baseband processor, wherein the baseband processor comprises a radio resource manager (RRM) and at least two modems, the at least two modems comprise a first modem and a second modem, and the method comprises:
receiving, by the RRM, a service request that is of a first service and that is initiated by the first modem, wherein the first modem is configured to process a first service of a first subscriber identity module (SIM) card;
when the RRM determines that there currently exists a second service that is initiated by the second modem and that is in a conflict with the first service in preempting a communication resource, comparing a first dynamic priority of the first service with a second dynamic priority of the second service to allocate the communication resource to one of the first service and the second service, wherein the second modem is configured to process the second service of a second SIM card, the communication resource comprises a resource formed by the RF system, each of the first service and the second service is a current service, and a dynamic priority of the current service is calculated by the RRM according to an initial priority of the current service and a dynamic service adjustment parameter.

13. The method according to claim 12, wherein the dynamic service adjustment parameter comprises a successive allocation failure count, the successive allocation failure count refers to a quantity of successive failures in applying for the communication resource to be allocated to the current service, and upon a success in applying for the communication resource to be allocated, the successive allocation failure count is reset to zero; and the method further comprises:
   when the RRM determines that the current service satisfies any one condition, calculating, by the RRM, the dynamic priority of the current service according to the initial priority of the current service and the successive allocation failure count, wherein when the successive allocation failure count is 0, the calculated dynamic priority is equal to the initial priority; or when the successive allocation failure count is greater than 0, the calculated dynamic priority is higher than the initial priority, and the dynamic priority increases with the increase of the successive allocation failure count; and
   wherein the any one condition comprises:
   the current service is a service with a fixed start moment, or a service without a fixed start moment and with infinite duration; or
   the current service is a service without a fixed start moment and with finite duration, and the dynamic priority of the current service remains within a third priority range within a first preset time period after a service request is initiated, wherein the initial priority of the current service is within a first priority range, and a priority corresponding to the third priority range is lower than a priority corresponding to the first priority range; or
   when the dynamic priority of the current service is within a second priority range, and the RRM receives a service protection removal notification for the current service, wherein the service protection removal notification instructs to adjust the dynamic priority of the current service from the second priority range to a first priority range, and a priority corresponding to the second priority range is higher than a priority corresponding to the first priority range.

14. The method according to claim 12, wherein the method further comprises:
   calculating, by the RRM, the first dynamic priority according to a first calculation formula, wherein the first calculation formula is: $F=C-(C-D)*(A/B)$, wherein F is a dynamic priority, C is an initial priority and is within a first priority range, D is a highest priority within the first priority range, A is a successive allocation failure count, B is a maximum threshold of the successive allocation failure count, a priority of C is lower than that of D, and A is less than B.

15. The method according to claim 12, wherein the current service is a service with infinite duration, and the method further comprises:
   when any one condition is satisfied, adjusting, by the RRM, the dynamic priority of the current service to a highest priority within a first priority range, wherein the initial priority of the current service is within the first priority range; and
   wherein the any one condition comprises:
   after the communication resource has been allocated to the current service, a single preemption time of the communication resource by another service except the current service within a preemption statistical period exceeds a first threshold, wherein the preemption statistical period is a second preset time period from a time at which the preemption of the communication resource by the another service except the current service starts to a time at which the preemption ends; or
   after the communication resource has been allocated to the current service, a total preemption time of the communication resource by another service except the current service exceeds a second threshold.

16. The method according to claim 12, wherein the initial priority of the current service is within a first priority range; the dynamic service adjustment parameter comprises a first protection priority; and the method further comprises:
   when the RRM receives a service protection notification for the current service, calculating, by the RRM, the dynamic priority of the current service according to the obtained initial priority and the first protection priority, wherein the service protection notification is used to instruct to ensure that the communication resource is allocated to the current service, the first protection priority is a highest priority within the first priority range, the calculated dynamic priority of the current service is within a second priority range, and a priority corresponding to the second priority range is higher than a priority corresponding to the first priority range.

17. The method according to claim 12, wherein the method further comprises:
   when the RRM receives a service protection notification for the current service, calculating, by the RRM, the dynamic priority of the current service according to a second calculation formula, wherein the service protection notification is used to instruct to ensure that the communication resource is allocated to the current service, and the second calculation formula is: $F=E+(C/N)$, wherein F is a dynamic priority, C is an initial priority and is within a first priority range, E is a highest priority within the first priority range, and N is a natural number greater than 1.

18. The method according to claim 12, wherein the current service is a service without a fixed start moment and with finite duration; the dynamic service adjustment parameter comprises a protection removal priority; and the method further comprises:
   calculating, by the RRM, the dynamic priority of the current service according to the obtained initial priority and the protection removal priority, wherein the initial priority of the current service is within a first priority range, the protection removal priority is a lowest priority within the first priority range, the calculated dynamic priority of the current service is within a third priority range, and a priority corresponding to the third priority range is lower than a priority corresponding to the first priority range.

19. The method according to claim 12, wherein the current service is a service without a fixed start moment and with finite duration, and the method further comprises:

calculating, by the RRM, the dynamic priority of the current service using a third calculation formula, wherein the third calculation formula is: $F=E+(C/N)$, wherein F is a dynamic priority, C is an initial priority and is within a first priority range, E is a lowest priority within the first priority range, and N is a natural number greater than 1.

20. The method according to claim 12, wherein the current service is a periodic service, the periodic service comprises services at multiple time points, and an interval between services at adjacent time points is a period of the periodic service; and the method further comprises:

calculating, by the RRM, a dynamic priority of a service at an $M^{th}$ time point according to the initial priority of the current service and a successive allocation failure count of a service between a first time point and an $(M-2)^{th}$ time point, wherein an interval between the $(M-2)^{th}$ time point and the $M^{th}$ time point is two periods of the periodic service, and M is a natural number greater than 3, wherein when the successive allocation failure count of the service between the first time point and the $(M-2)^{th}$ time point is 0, the calculated dynamic priority of the service at the $M^{th}$ time point is equal to an initial priority of the periodic service; or when the successive allocation failure count of the service between the first time point and the $(M-2)^{th}$ time point is greater than 0, the calculated dynamic priority of the service at the $M^{th}$ time point is higher than the initial priority, and the dynamic priority increases with the increase of the successive allocation failure count.

* * * * *